United States Patent [19]

Higuchi et al.

[11] Patent Number: 6,167,037

[45] Date of Patent: Dec. 26, 2000

[54] SIGNAL TRANSMITTING METHOD, TRANSMITTER, RECEIVER, AND SPREAD-SPECTRUM CODE SYNCHRONIZING METHOD FOR MOBILE COMMUNICATION SYSTEM

[75] Inventors: Kenichi Higuchi, Yokosuka; Mamoru Sawahashi, Yokohama; Fumiyuki Adachi, Yokohama; Koji Ohno, Yokohama; Akihiro Higashi, Yokosuka, all of Japan

[73] Assignee: NTT Mobile Communications Networks Inc., Tokyo, Japan

[21] Appl. No.: 08/952,081

[22] PCT Filed: Mar. 4, 1997

[86] PCT No.: PCT/JP97/00657

§ 371 Date: Nov. 3, 1997

§ 102(e) Date: Nov. 3, 1997

[87] PCT Pub. No.: WO97/33400

PCT Pub. Date: Sep. 12, 1997

[30] Foreign Application Priority Data

Mar. 5, 1996 [JP] Japan .................................. 8-047774
Jun. 24, 1996 [JP] Japan .................................. 8-163462
Oct. 15, 1996 [JP] Japan .................................. 8-272696

[51] Int. Cl.[7] .................................................. H04B 7/216
[52] U.S. Cl. ........................... 370/335; 370/342; 370/441; 370/503
[58] Field of Search .................................. 370/335, 342, 370/441, 320, 350, 515, 503, 509, 519; 375/200, 208, 209, 210, 359, 365, 367

[56] References Cited

U.S. PATENT DOCUMENTS 5,111,478  5/1992  McDonald .............................. 375/200
5,329,547  7/1994  Ling ....................................... 370/342
5,345,469  9/1994  Fulghum ................................ 370/342
5,535,239  7/1996  Padovani et al. ...................... 370/209
5,790,588  8/1998  Fukawa et al. ........................ 375/200

FOREIGN PATENT DOCUMENTS 5-506763  9/1993  Japan .
6-501349  2/1994  Japan .

*Primary Examiner*—Hassan Kizou
*Assistant Examiner*—Mitchell Slavitt
*Attorney, Agent, or Firm*—Brown Raysman Millstein Felder Steiner LLP

[57] ABSTRACT

Achieving high speed spreading code synchronization of a forward link control channel. A control channel information signal and traffic channel information signals are each spread by different first spreading codes which are fed from a first spreading code (short code) generator (11), and which have a period equal to the period of an information symbol. Subsequently, only the control channel information signal is spread by a third spreading code which is fed from a third spreading code (long code masked portion complex conjugate code) generator (12), and which has a form of complex conjugate of a long code (second spreading code) used for spreading in common. The signals of the entire channels are summed up by an adder (13) at appropriate timings, and the resultant sum is spread by the second spreading code fed from a second spreading code generator (14), thereby being output as a spread modulation signal.

30 Claims, 31 Drawing Sheets

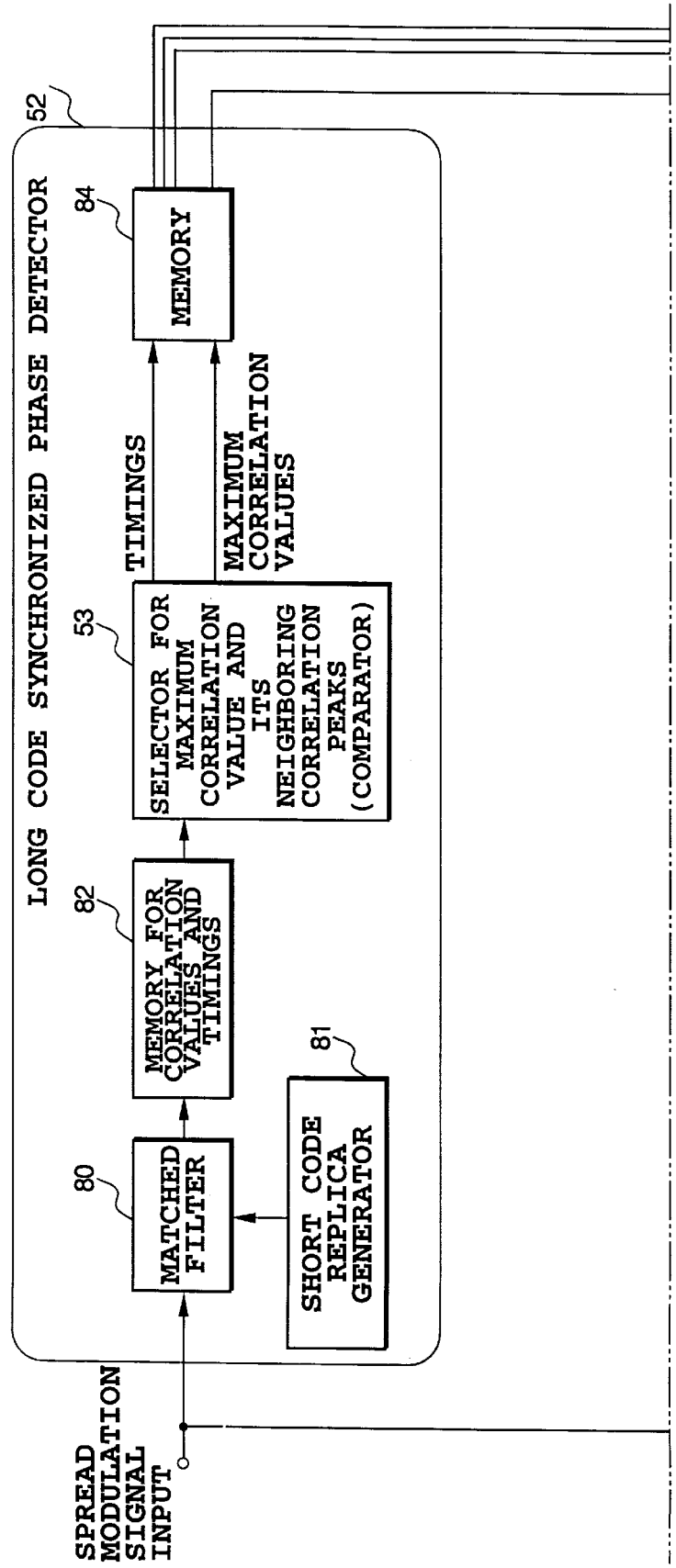

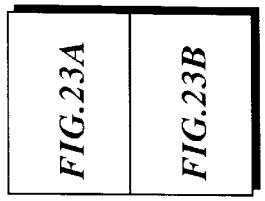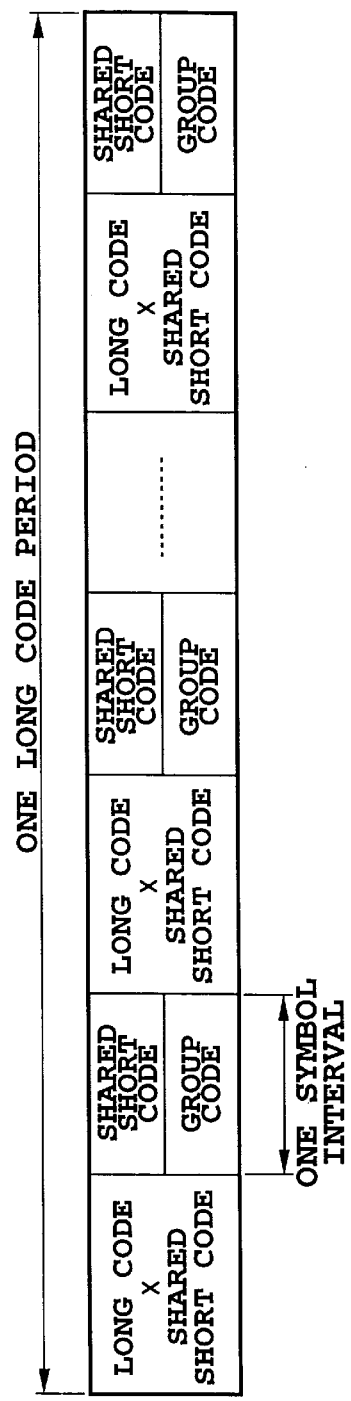
*FIG.23A*

FIG.23B

LONG CODE × SHARED SHORT CODE

EXAMPLE 1
LONG CODES USED BY BASE STATIONS FOR SPREADING

| | SHARED SHORT CODE | ... | SHARED SHORT CODE | SHARED SHORT CODE |
|---|---|---|---|---|
| GROUP 1 { LONG CODE #1 ... LONG CODE #(N/3) | GROUP CODE #1 | ... | GROUP CODE #1 | GROUP CODE #1 |
| GROUP 2 { LONG CODE #(N/3+1) ... LONG CODE #(2N/3) | GROUP CODE #2 | ... | GROUP CODE #2 | GROUP CODE #2 |
| GROUP 3 { LONG CODE #(2N/3+1) ... LONG CODE #N | GROUP CODE #3 | ... | GROUP CODE #3 | GROUP CODE #3 |

EXAMPLE 2
LONG CODES USED BY BASE STATIONS FOR SPREADING

| | SHARED SHORT CODE | ... | SHARED SHORT CODE | SHARED SHORT CODE |
|---|---|---|---|---|
| GROUP 1 { LONG CODE #1 ... LONG CODE #(N/3) | GROUP CODE #1 | ... | GROUP CODE #1 | GROUP CODE #1 |
| GROUP 2 { LONG CODE #(N/3+1) ... LONG CODE #(2N/3) | GROUP CODE #2 | ... | GROUP CODE #2 | GROUP CODE #2 |
| GROUP 3 { LONG CODE #(2N/3+1) ... LONG CODE #N | GROUP CODE #2 | ... | GROUP CODE #1 | GROUP CODE #2 |

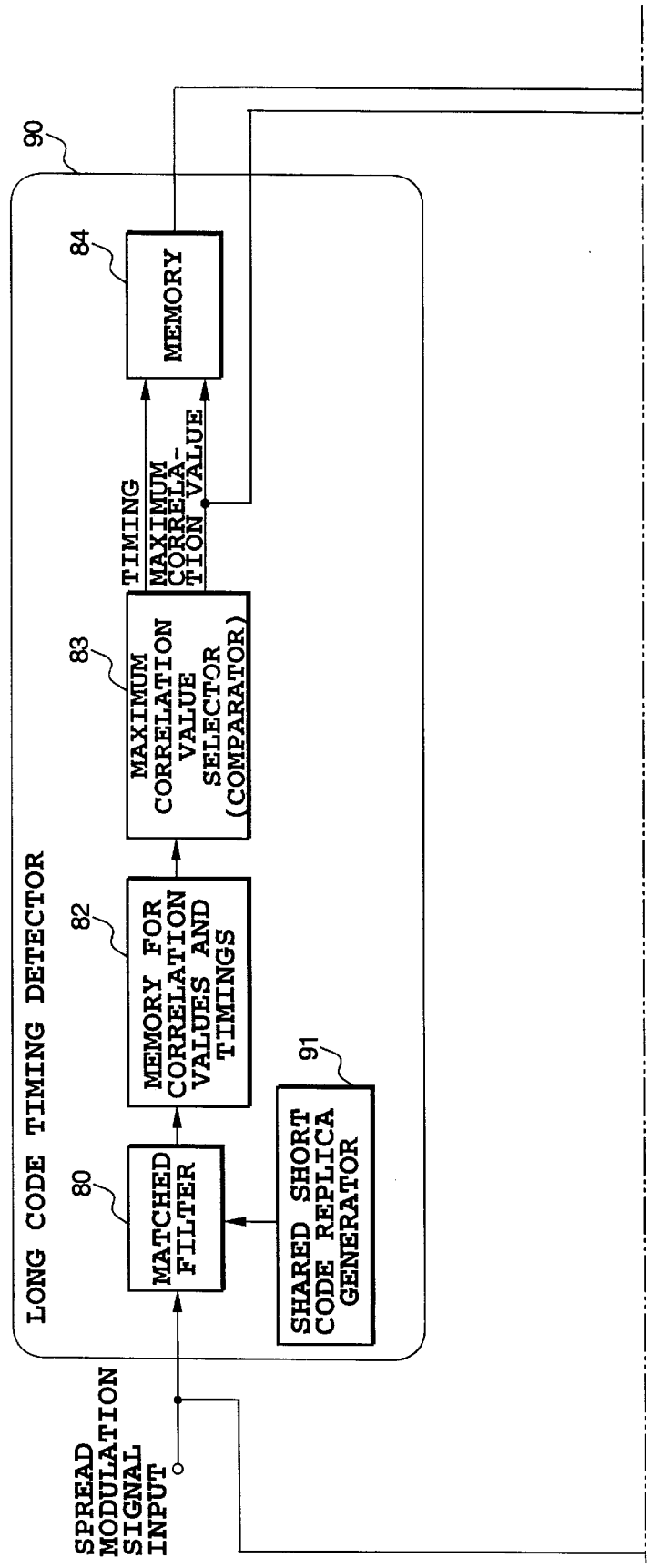

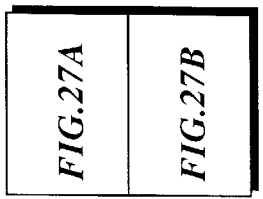
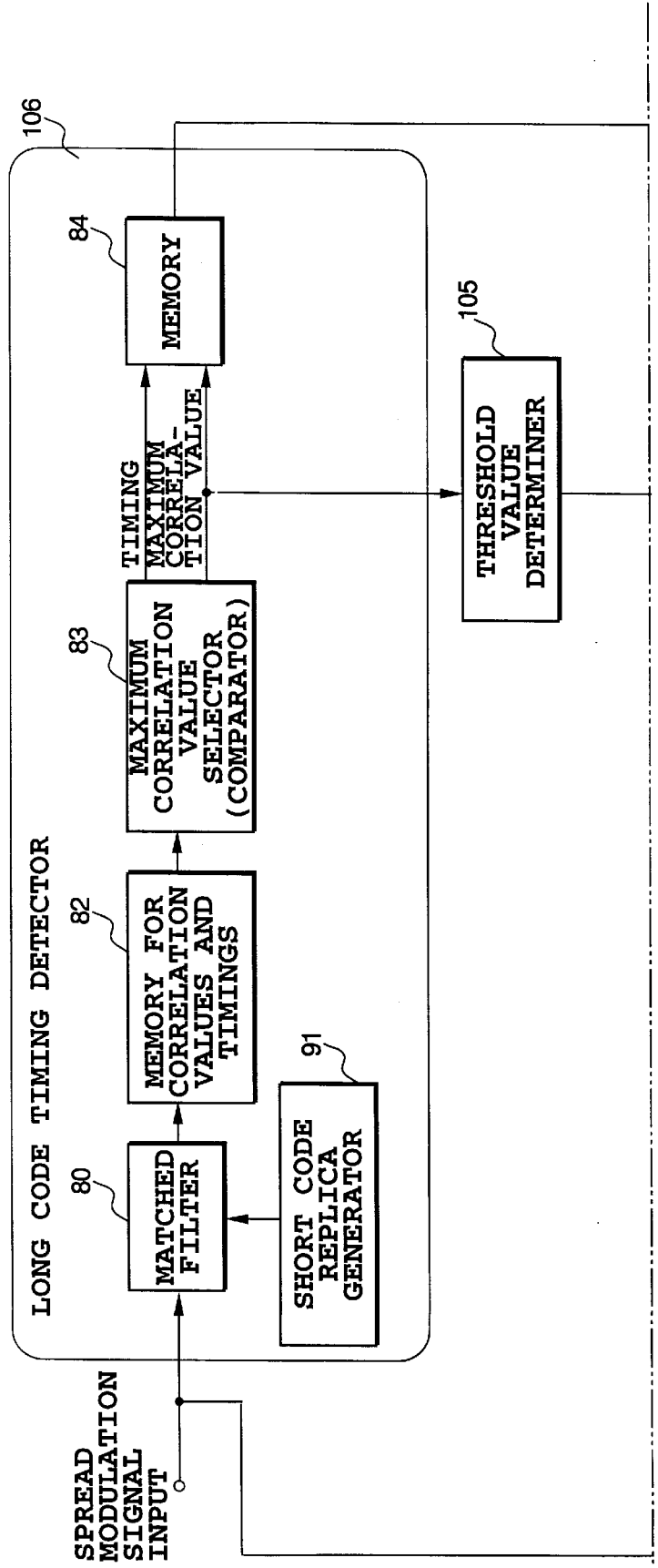

SIGNAL TRANSMITTING METHOD, TRANSMITTER, RECEIVER, AND SPREAD-SPECTRUM CODE SYNCHRONIZING METHOD FOR MOBILE COMMUNICATION SYSTEM

TECHNICAL FIELD

The present invention relates to a signal transmission method, transmitter, receiver and spreading code synchronization method in mobile communication systems to which is applied a direct sequence code division multiple access (DS-CDMA) scheme carrying out multiple access using direct sequence.

BACKGROUND ART

The DS-CDMA communication method is a scheme that transmits information data after spreading their bandwidth using a code with a rate much higher than the information data rate, and its research and development have been intensively conducted to be applied to cellular systems. This is because the DS-CDMA systems have such characteristics as facilitating flexible cell design which will enable the capacity in terms of the number of users to be increased as compared with the conventional frequency division multiple access (FDMA) or time division multiple access (TDMA).

The DS-CDMA systems include two spreading methods: One carries out spreading using a spreading code called a "short code" with a period equal to that of the information symbols; and the other carries out spreading using a spreading code called a "long code" with a period much longer than that of the information symbols. As the spreading codes, Gold codes or others are used. The Gold codes consists of two M (maximum) sequences, and the Gold codes belonging to the same group can be generated by the number corresponding to its period.

Accordingly, the number of the Gold codes that can be generated is no more than that corresponding to the processing gain (PG) or spreading ratio. As a result, in the cellular systems, the same spreading code cannot be used within several cells because of interference from other cells, and this presents a reuse problem in spreading code assignment.

On the other hand, using a long code enables to generate a great number of codes by lengthening its period. Thus, each cell can assign spreading codes to users independently of the other cells in the multicellular configuration. This is because the probability is very small that the same code is used at the same time in another cell thanks to the great number of the codes.

In the cellular systems, besides the incoming radio wave traveling through the shortest path from the transmitting point, there are delayed waves resulting from reflection and refraction due to obstacles or configuration of ground such as surrounding buildings, mountains, towers, etc. Since the delayed waves usually become interference signals against desired waves, they will degrade received characteristics. In the DS-CDMA system, the information signals are transmitted as very fast signals. Thus, when they are spread to 1 MHz band, the desired waves can be separated from delayed waves with a delay of one microsecond by carrying out correlation detection at a resolution of one microsecond. Combining these waves after demodulating independently, which is called RAKE combining, has an advantage of making full use of the power of the delayed waves.

In this case, since each one of consecutive information symbols is spread by a spreading code of the same pattern in the short code system, the delayed waves with a delay beyond one information symbol cannot be combined. On the contrary, since the consecutive information symbols are spread with different portions of a long code in the long code system, the delayed waves with a delay beyond one information symbol can be RAKE combined.

Although the long code has various merits as described above, it has a demerit that it takes a long time to establish the synchronization of the spreading code. Specifically, a DS-CDMA receiver must establish synchronization of the phase of a spreading code replica at the receiver side with that of the spreading code in a received signal at the beginning of communications. Since the long code has a much longer spreading code phase to be searched for compared with the short code, much longer time is required for establishing the synchronization.

The receiver conducts the correlation detection using a matched filter as shown in FIG. 3 and a sliding correlator as shown in FIG. 4.

(Description based on FIG. 3)

The matched filter usually includes delay elements 1 with a delay of one chip, and spreading code multipliers 2, the number of each of them corresponds to the processing gain. Each of the spreading code multipliers 2 can be composed of an exclusive OR (EXOR) circuit because the spreading code replica is usually binary. A spread modulation signal which has been frequency converted to the baseband with the zero IF frequency and is input to the matched filter, is delayed by the number of times of the processing gain, and they are each multiplied by a spreading code replica fed from a spreading code replica generator 3. The resultant product signals are summed up by an adder 4. When the phase of the spreading code in the spread modulation signal is synchronized with that of the spreading code replica, the output of the adder 4 takes a peak correlation value whose power is increased by a factor of processing gain from the average power obtained with asynchronous phases. Thus, since the matched filter detects the correlation using space integration, it has an advantage of shortening the initial acquisition time of the spreading code.

(Description based on FIG. 4)

In the sliding correlator, a multiplier 6 multiplies the spread modulation signal by a spreading code replica generated by a spreading code replica generator 5, and then an integrating/dumping circuit 7 performs integral of the resultant product by an amount of the processing gain. The multiplier can be composed of an EXOR because the spreading code replica is usually binary. The integral time in the integrating/dumping circuit 7 is usually one information symbol period. The integrated signal is square-law detected by a square-law detector 8 to generate its amplitude component whose value undergoes threshold decision by a threshold value decision circuit 9. Thus, the a decision is made whether they are synchronized or not. If the integral value does not exceed the threshold value, a decision is made that they are not yet synchronized, and the threshold value decision circuit 9 controls a digitally controlled clock generator 10 such that the phase of the spreading code replica output from the spreading code replica generator 5 is updated by advancing it by J chips (usually, J=1). Thus, since the sliding correlator performs time integral, it is smaller than the matched filter in circuit scale, but takes a longer time for the initial acquisition.

As described above, the matched filter requires a shorter acquisition time thanks to the space integral, but is larger in the circuit scale. On the contrary, the sliding correlator is smaller in the circuit scale thanks to the time integral, but requires a longer acquisition time.

Defining that

A: the number of long codes to be searched,

Q: the number of phases of the entire chips of a long code to be searched,

PG: the processing gain,

M: the number of symbols to be integrated for correlation detection,

Tc: chip period, $N_{SC}$: the number of sliding correlators, $N_{MF}$: the number of matched filters $T_{SC}$: acquisition time of the sliding correlators, and $T_{MF}$: acquisition time of the matched filters, the acquisition times of the sliding correlator and the matched filter become as follows when there are no thermal noise, or no cross-correlation due to interference from the delayed waves from other users or its own channel signal.

In the case of the sliding correlator:

$$T_{SC} = A \times Q \times PG \times M \times T_C / N_{SC}$$

In the case of the matched filter $$T_{MF} = A \times Q \times M \times T_C / N_{MF}$$

When using the long code, since the number A of long code and the number Q of phases to be searched are enormous, there is a problem in that it takes a very long acquisition time.

DISCLOSURE OF THE INVENTION

As described above, a mobile communication system using long codes has a problem in that it takes a very long time for a mobile station to establish the acquisition of the spreading code before capturing a control channel from a base station after the mobile station is powered up.

Furthermore, to capture a channel in a cellular environment in which time synchronization is not established between base stations, a receiver must carry out code search, an operation for detecting a spreading code used for spreading the signal on a receiving channel. In practice, the receiver must detect spreading codes used for spreading signals transmitted through channels from a plurality of base stations to receive one of the signals. Subsequently, the receiver establishes the acquisition, and measures the received level to determine the channel to be connected. Thus, the time period taken to complete the acquisition of the channel in the cellular environment corresponds to that needed for the code search, and hence it takes an enormous time when the long spreading code is used for spreading.

Moreover, in the mobile communication environment, the cell or the base station with which the receiver (mobile station) communicates changes as the receiver moves. To achieve the switching, the receiver must carry out the cell search by measuring the received levels by regularly establishing the acquisition of the spreading codes on channels connected to base stations surrounding the current base station with which the receiver is communicating at present.

Therefore, it is an object of the present invention to provide a signal transmission method, transmitter and receiver, and a spreading code synchronization method, which can achieve fast, highly accurate acquisition of the spreading codes in a mobile station in a mobile communication system using long codes.

According to the first aspect of the present invention, a signal transmission method in a mobile communication system in a direct sequence CDMA communication system which transmits a wideband signal spread using a spreading code with a rate higher than an information rate, the signal transmission method comprises the steps of:

using a first spreading code group and a second spreading code group, the first spreading code group being common to respective base stations and having a period equal to an information symbol period, and the second spreading code group being different from base station to base station and having a period longer than the information symbol period; and masking, when transmitting a signal which is doubly spread using a first spreading code in the first spreading code group and a second spreading code in the second spreading code group, the second spreading code for M symbols at fixed intervals, where M is a natural number equal to or greater than one.

Here, the receiver in a mobile communication system may comprise:

first synchronization detecting means for detecting a synchronized time of a first spreading code from a detection time of a correlation output value, the correlation output value being obtained through a correlation detection processing between a spread modulation signal obtained by receiving a signal transmitted by the transmission means of claim 1 and a first spreading code in the first spreading code group of claim 1; and second synchronization detection means for performing correlation detection sequentially using codes obtained by multiplying the first spreading code by A (A is a natural number) second spreading codes in the second spreading code group of claim 1, and for deciding a second spreading code having a maximum correlation value, wherein the correlation detection is started from a time position at which a maximum correlation value is detected by the first synchronization detection means.

Here, the receiver of a mobile communication system may comprise:

first spreading code synchronized phase memory means for storing B dominant time positions in descending order of magnitude of correlation values detected by the first synchronization means of claim second spreading code synchronization detecting means for performing correlation operations sequentially between a received signal and codes obtained by multiplying the first spreading code of claim 1 by B spreading codes in the second spreading codes of claim 1 of contiguous base stations of a current base station of which the current base station notifies, wherein the correlation operations are started from time positions stored in the first spreading code synchronization memory means, and are carried out in descending order of magnitude of the correlation values stored in the first spreading code synchronization memory means; and means for detecting which codes of the second spreading codes correspond to the B dominant time positions of the first spreading codes of claim 1.

Here, the spreading code synchronization method may comprise the steps of:

performing correlation detection between a received spread modulation signal and codes obtained by multiplying the first spreading code of claim 1 by second spreading codes of the second spreading code group of claim 1 to decide the second spreading code used for spreading the received spread modulation signal, wherein the correlation detection is started from a time position at which a maximum correlation output signal is obtained in correlation detection between the first spreading code of claim 1 and the received spread modulation signal obtained by receiving a signal transmitted by the transmission method of claim 1; and deciding, after carrying out the correlation detection between the received spread modulation signal and the codes obtained by multiplying the first spreading code by the second spreading codes, the second spreading code giving a maximum correlation value as the second spreading code used for spreading the received spread modulation signal.

In the spreading code synchronization method, a searching may be continued until the maximum correlation value between the received spread modulation signal and the codes obtained by multiplying the first spreading code by the second spreading codes exceeds a predetermined threshold value T.

In the spreading code synchronization method, the threshold value T may be determined depending on the maximum correlation detection value between the received spread modulation signal and the first spreading code.

Here, the receiver may comprise:

the first spreading code synchronized phase memory means of claim 4; and received level detection means for detecting received signal power by generating delay profiles of multipaths for each base stations by detecting correlations between a received spread modulation signal and codes obtained by multiplying a first spreading code by second spreading codes of a current base station and contiguous base stations in a particular time range around a time position of the first spreading code synchronized phase memory means, wherein the received level detecting means carries out, in a second and following searches, a searching around a time position of a path obtained by previous search.

In the receiver, the received level detecting means may suppress a searching at symbol positions spread by only the first spreading code when a frame structure is used which includes portions spread by only the first spreading code for one or more symbols.

Here, the spreading code synchronization method may comprise:

a first synchronization detection step of performing correlation detection processing between a spread modulation signal obtained by receiving a signal transmitted by a transmission method of claim 1 and a first spreading code of the first spreading code group of claim 1 to detect a synchronized time of the first spreading code from a detection time of the correlation output value; and a second synchronization detection step of performing correlation detection sequentially on codes obtained by multiplying the first spreading code by A (A is a natural number) second spreading codes in the second spreading code group of claim 1 to decide a second spreading code giving a maximum correlation value, wherein the correlation detection is started at a time position at which a maximum value is obtained which is detected by the first synchronization detection step.

Here, the spreading code synchronization method may comprise:

a first spreading code synchronized phase memorizing step of storing B dominant time positions in descending order of magnitude of correlation values detected by the first synchronization step of claim 10;

a second spreading code synchronization detection step of performing, in descending order of magnitude of correlation values, correlation operations sequentially between a received signal and codes obtained by multiplying the first spreading code of claim 1 by B spreading codes of the second spreading codes of claim 1 of contiguous base stations of a current base station of which the current base station notifies, wherein the correlation operations are started from time positions stored in the first spreading code synchronized phase memorizing step; and a step of detecting which second spreading codes correspond to B dominant time portions of the correlation values with the first spreading code of claim 1.

In the spreading code synchronization method, the correlation detection between the first spreading code and the received spread modulation signal, and the correlation detection between the received spread modulation signal and the codes obtained by multiplying the second spreading codes by the first spreading code may be performed in parallel.

In the spreading code synchronization method, when detecting the second spreading code synchronized phase of contiguous base stations using correlation values between the first spreading code and the received spread modulation signal in a contiguous base station search mode of deciding a base station to be connected at handover during communications, phases different from a synchronized phase of a current base station may be selected as candidates of synchronized phases of the contiguous base stations to be decided.

In the signal transmission method in a mobile communication system, two or more mask symbols for masking the second spreading codes may be intermittently provided during one second spreading code period.

In the signal transmission method in the mobile communication system, transmission timings of the mask symbols may be set at uneven intervals known in advance to a mobile station side.

In the spreading code synchronization method, a phase of the received second spreading code may be uniquely decided in accordance with received timings of the unevenly disposed mask symbols when receiving the signal transmitted by the transmission method of claim 15.

In the spreading code synchronization method, when there is deviation between clocks of a transmitter and a receiver, correlations may be obtained in parallel using a plurality of correlators whose phases are shifted from one another by an amount of $\Delta$ which corresponds to $aTc$, where a is a real number and Tc is a chip period, while performing correlation detection between the received spread modulation signal and the codes obtained by multiplying the first spreading code by the second spreading code in the second spreading code group.

In the signal transmission method in a mobile communication system, the second spreading code may be masked n times during its period L, at even intervals L/n.

In the signal transmission method in a mobile communication system, may further comprise the step of transmitting at a predetermined timing a signal spread by an unshared first spreading code corresponding to the second spreading code used by each of the base stations.

Here, the spreading code synchronization method may comprise the steps of:

receiving a signal transmitted in the transmission method of claim 19;

detecting a received timing of a second spreading code by detecting correlation between the received signal and a shared first spreading code;

detecting a second spreading code group including a second spreading code to be used for spreading the received signal by detecting correlation between the received signal and first spreading codes in a first spreading code group at received timings of signals spread by unshared first spreading codes, which received timings are obtained from received timings of the second spreading codes, and by deciding the unshared first spreading code giving a maximum correlation; and identifying the second spreading code used for spreading the received signal from magnitudes of correlation values detected between the received signal and spreading codes obtained by multiplying the shared first spreading code by the second spreading codes in the second spreading code group detected in the preceding step.

Here, the spreading code synchronization method may comprise the steps of:

receiving a signal transmitted by the transmission method of claim 18;

detecting received timings of signals spread by only the first spreading code from timings giving maximum correlation values obtained by observing correlation between the received signal and the first spreading code at every interval of the L/n periods;

detecting n received timings of the second spreading code which are shifted by an amount of the L/n periods from one another using the received timings of the signals spread by only the first spreading code; and detecting correlation values between the received signal and the spreading codes obtained by multiplying the first spreading code by the second spreading codes in the second spreading code group at phases synchronized with the detected n received timings of the second spreading code shifted by the amount of L/n periods to identify the second spreading code to be used for spreading the received signal from magnitudes of the correlation values and to determine n received timing candidates of the second spreading code.

In the spreading code synchronization method, correlations may be taken between the received spread modulation signal and the codes obtained by multiplying the first spreading code by the second spreading codes in parallel at a plurality of peak positions of a correlation between the received spread modulation signal and the first spreading code, thereby improving a detection accuracy of the spreading code synchronization, wherein the peak positions are due to multipaths.

In the spreading code synchronization method, the correlation detection between the first spreading code and the received spread modulation signal, and the correlation detection between the received spread modulation signal and the codes obtained by multiplying the second spreading codes by the first spreading code may be performed in parallel.

In the spreading code synchronization method, when detecting the second spreading code synchronized phase of contiguous base stations using correlation values between the first spreading code and the received spread modulation signal in a contiguous base station search mode of deciding a base station to be connected at handover during communications, phases except for a synchronized phase of a current base station may be selected as synchronized phase candidates of the contiguous base stations to be decided.

In the spreading code synchronization method, the phase of the received second spreading code may be uniquely decided in accordance with a received timing of the unevenly disposed mask symbols when receiving the signal transmitted by the transmission method of claim 15.

In the spreading code synchronization method, when there is deviation between clocks of a transmitter and a receiver, correlations may be obtained in parallel using a plurality of correlators whose phases are shifted from one another by an amount of $\Delta$ which corresponds to aTc, where a is a real number and Tc is a chip period, while performing correlation detection between the received spread modulation signal and the codes obtained by multiplying the first spreading code by the second spreading code in the second spreading code group.

According to the second aspect of the present invention, a transmitter in a mobile communication system comprises:

first code spreading means for spreading signals of all channels using first spreading codes which belong to a first spreading code group and differ from one another, the first spreading code group being common to respective base stations and having a period equal to an information symbol period;

second code spreading means for spreading for M symbols one or more spread signals fed from the first code spreading means using a third spreading code, where M is a natural number equal to or greater than one, the third spreading code being a complex conjugate of a second spreading code which differs from base station to base station and has a period longer than the information symbol period;

adding means for adding at appropriate timings a signal on a channel spread by the first code spreading means and signals of one or more channels spread by the second code spreading means; and third code spreading means for spreading by using the second spreading code the signals of the channels output from the adding means.

BRIEF DESCRIPTION OF THE DRAWINGS

FIG. 19 is a diagram illustrating the relationship between FIGS. 19A and 19B;

FIG. 19A is a block diagram showing a long code synchronized phase detector in the block diagram showing another configuration for the spreading code synchronization processing in the receiver in accordance with the present invention;

FIG. 23 is a diagram illustrating the relationship between FIGS. 23A and 23B;

FIG. 23A is a diagram illustrating a transmission frame structure associated with claim 19 of the present invention;

FIG. 23B is a diagram illustrating the transmission frame structure associated with claim 19 of the present invention;

FIG. 25 is a diagram illustrating the relationship between FIGS. 25A and 25B;

FIG. 25A is a block diagram showing a long code timing detector in a synchronization detector associated with the spreading code synchronization method in accordance with claim 20 of the present invention;

FIG. 27 is a diagram illustrating the relationship between FIGS. 27A and 27B;

FIG. 27A is a block diagram showing a long code timing detector in a synchronization detector associated with the spreading code synchronization method in accordance with claim 21 of the present invention.

BEST MODE FOR CARRYING OUT THE INVENTION

Figure 1:
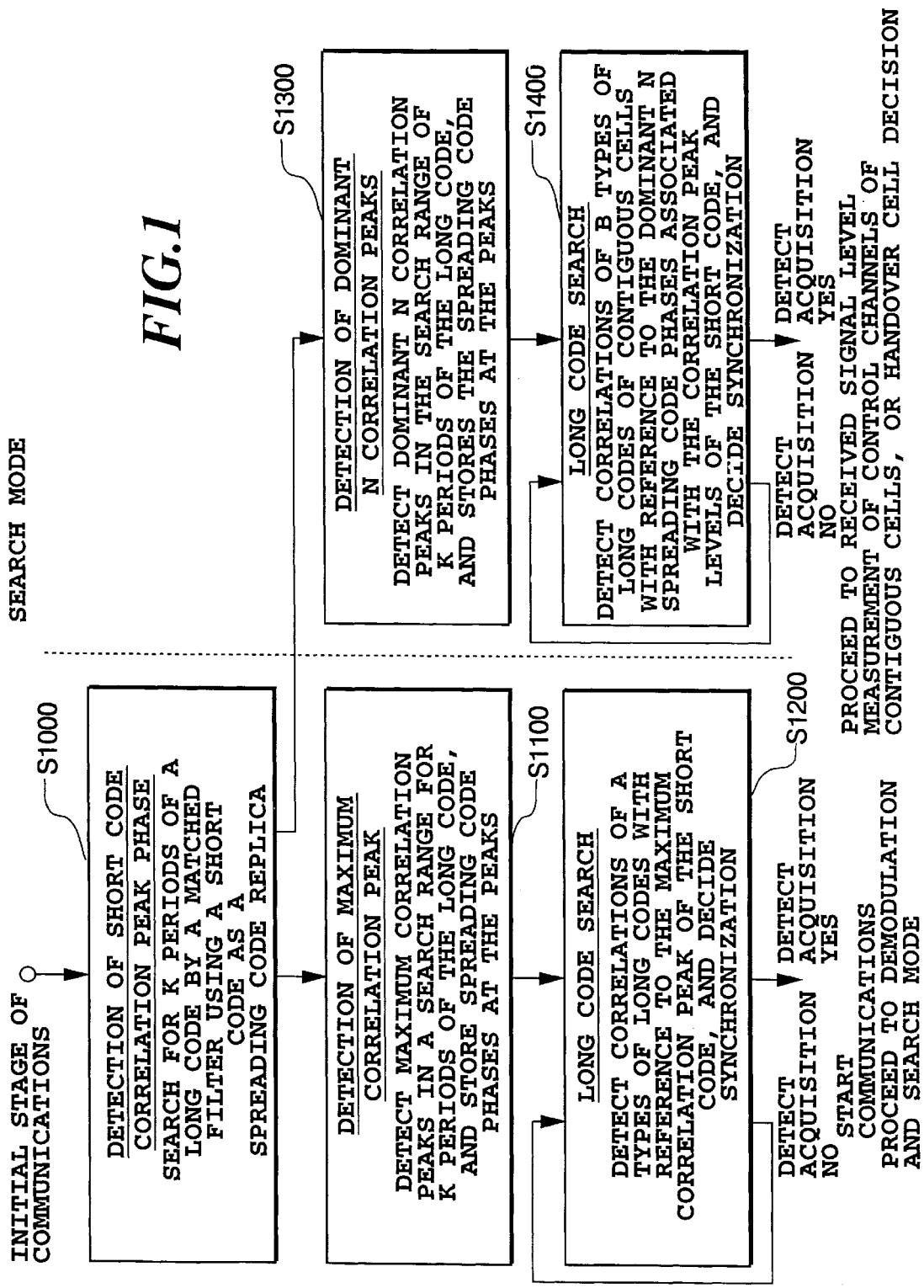
FIG. 1 is a diagram illustrating the algorithm of the spreading code synchronization method in accordance with the present invention.
Figure 2:
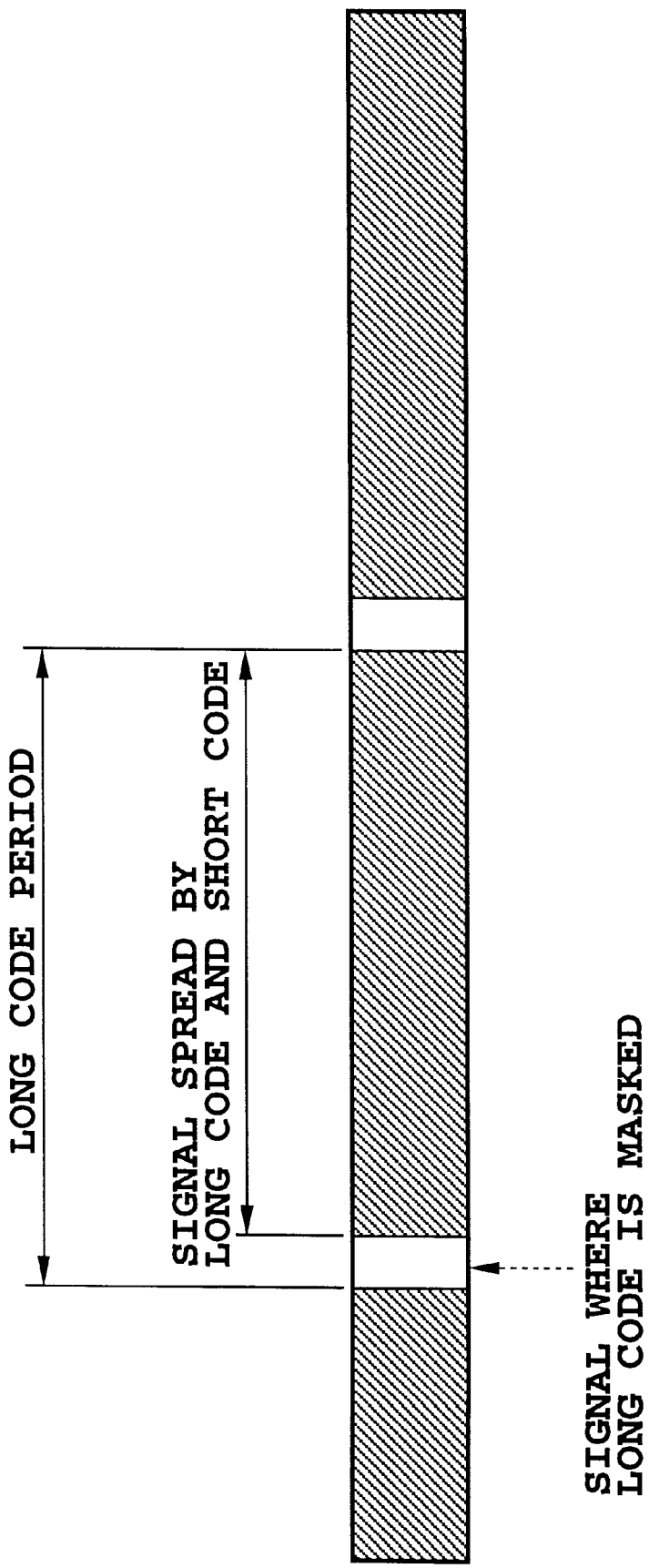
FIG. 2 is a diagram showing the frame structure of a spread modulation method in accordance with the present invention.
Figure 3:
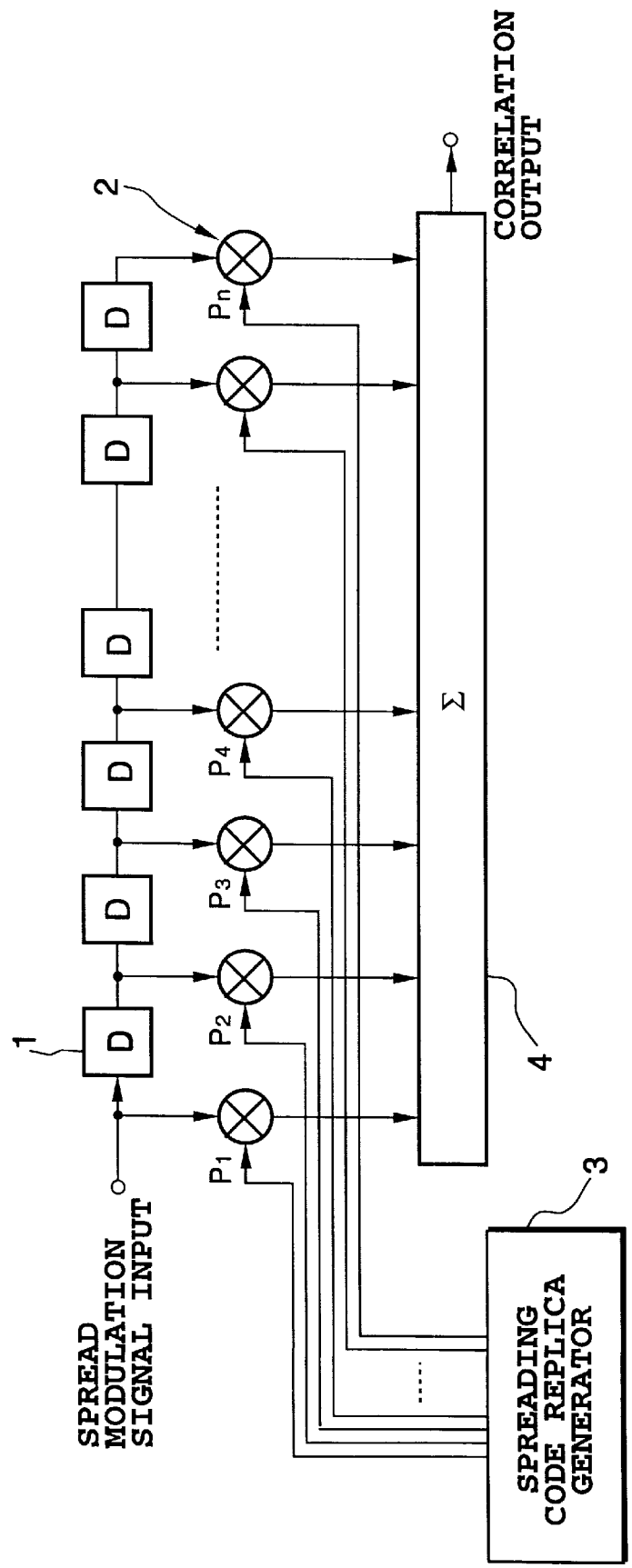
FIG. 3 is a block diagram showing a conventional matched filter.
Figure 4:
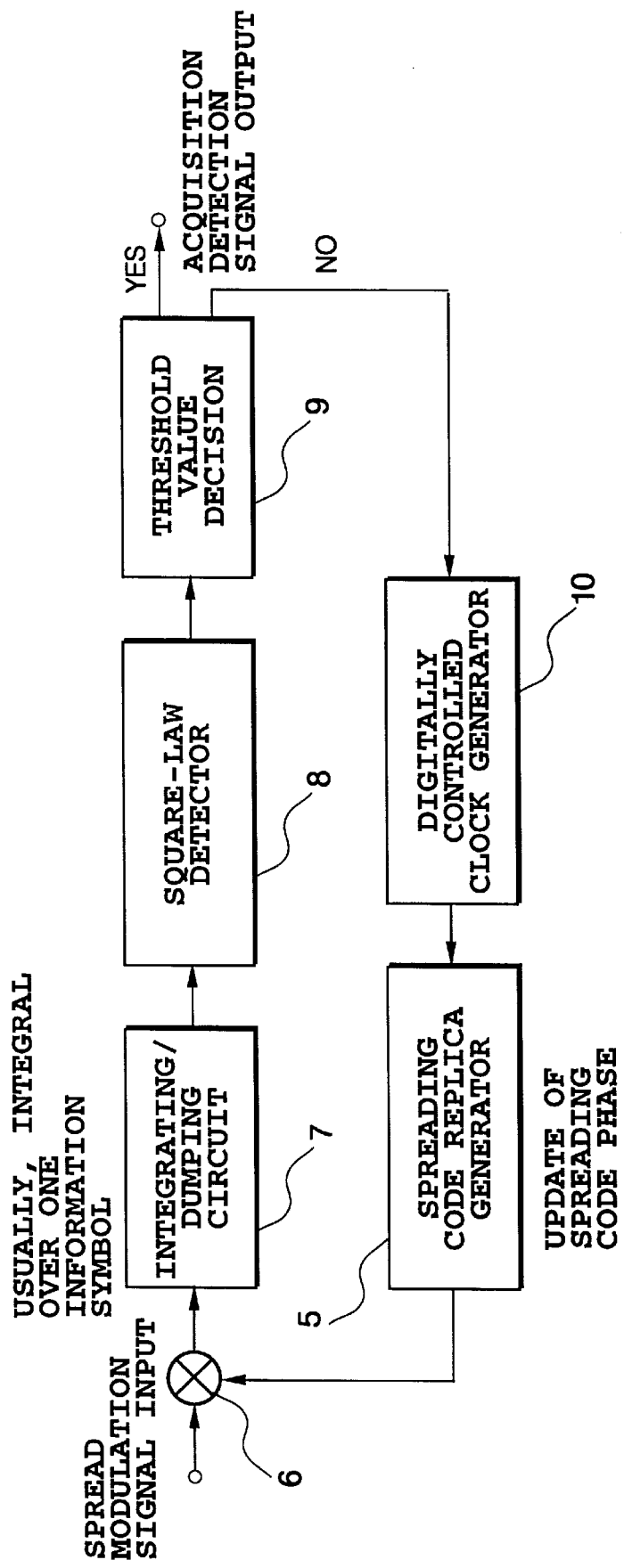
FIG. 4 is a block diagram showing a conventional sliding correlator.

FIG. 1 is a diagram illustrating a fundamental operation algorithm of claims of the present invention (S1000–S1400). In accordance with the present invention, a control channel is spread using a short code in conjunction with a long code as a spreading code. A plurality of cells share the same short codes, and each base station has a different long code. The long code is masked for M symbols at every fixed interval as shown in FIG. 2 so that the masked portions are spread by only the short code. Each base station transmits a control channel spread by such a spreading code.

Figure 6:
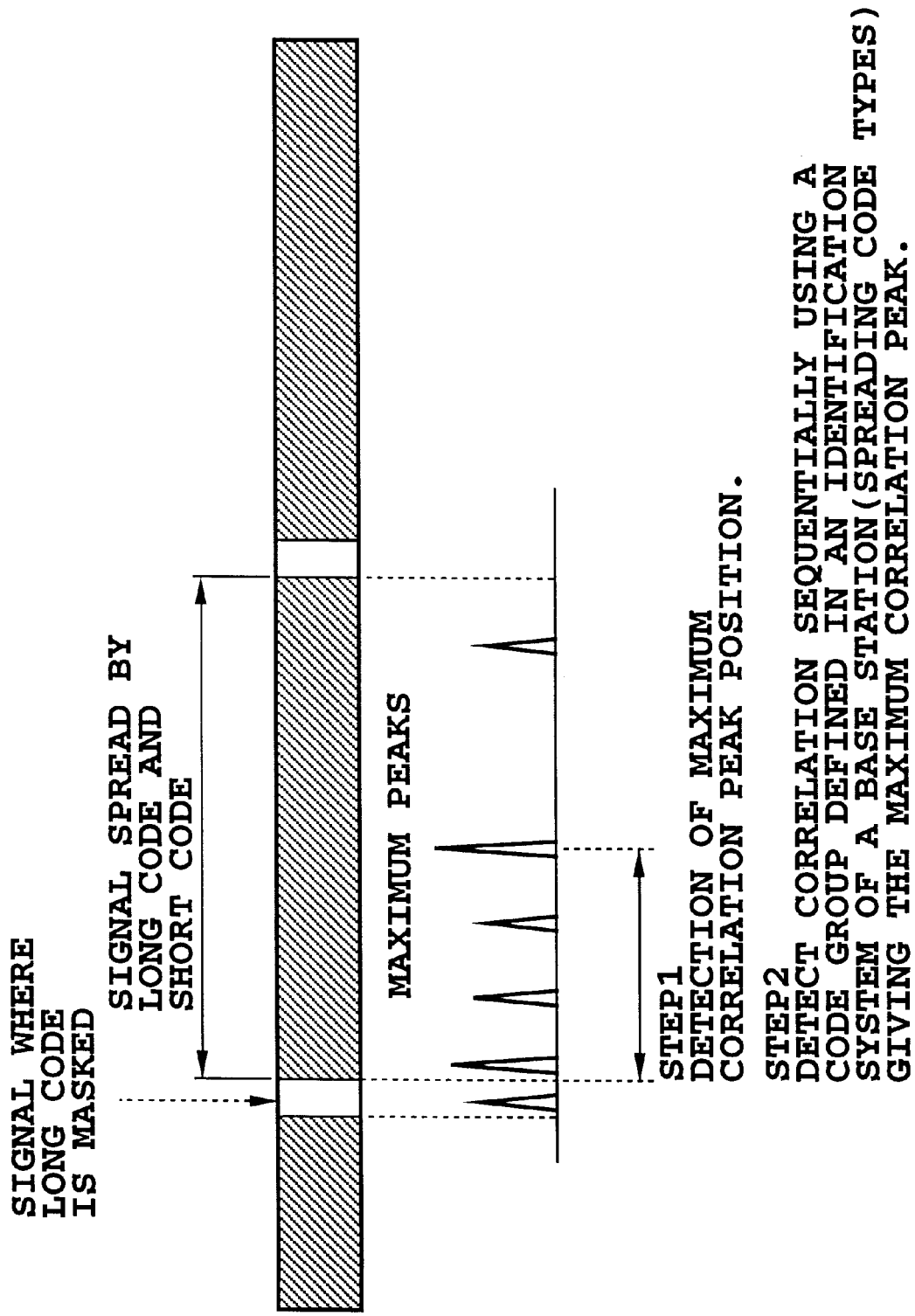
FIG. 6 is a diagram illustrating a search method of the long code acquisition in accordance with the present invention.

FIG. 6 illustrates a search method of the long code acquisition scheme in accordance with the present invention. A mobile station first carries out correlation detection by a matched filter using a short code common to all the cells as a spreading code replica at S1000 of FIG. 1.

The correlation detection is carried out for X periods of the long code by the matched filter, and the maximum correlation output peak is detected in that time period at S1100 of FIG. 1. The mobile station is connected to the base station which has sent the signal associated with the maximum correlation peak.

In this case, since it is determined in advance which phase of the long code comes next to the symbols where the long code is masked, that is, the symbols spread by only the short code, the long code phase can be identified from the maximum correlation output peak phase of the short code. Only, since the types of the long codes differ from base station to base station, the search must be carried out for the entire long codes at S1200 of FIG. 1. The search can be performed by the sliding correlator, which enables consumed power to be reduced.

The accuracy of the correlation detection can be improved by integrating a signal subjected to processing gain integral for a plurality of information symbols considering the polarity of the signal. Although the conventional long code system must search over the entire chip phases of all types of long codes, the method in accordance with the present invention can sharply reduce the acquisition time. Besides, since the matched filter is used only for the correlation detection of the short code over the first one period of the long codes, and then the sliding correlator with a lower power consumption is used for the search of the long codes, the power saving of the correlation detector can be achieved.

Once the acquisition of the spreading code has been established, the search process during communications is carried out as follows. First, in the acquisition process at the power up, the short code correlation peaks at the long code masked portions are detected by the matched filter using a spreading code replica of the short code. N dominant peaks out of the detected peaks are stored at step S1300 of FIG. 1.

In ordinary cellular configurations, N is the number of the base station to be connected and its surrounding six base stations, which becomes seven.

Since the mobile station is currently connected to the base station which gives the maximum correlation detection peak (received signal level) of the short code, it is necessary for deciding the handover base station while the mobile station moves to detect the received signal levels of the control channels (perch channels) of contiguous cells. In this case, since the positions of correlation detection values of the short code of the contiguous cells are known in advance, it is sufficient to search the types of the long codes at the synchronized positions in descending order of magnitude of the received signal levels. Thus, the search time when using the sliding correlator becomes $$T_{SC}=(B+(B-1)+(B-2)+2) \times PG \times M \times T_C/N_{SC}$$

where B is the number of the contiguous cells to be searched. Thus, the search time can be reduced sharply (S1400 of FIG. 1). This search time is obtained assuming that no thermal noise or interference signal is present, and hence that an error detection probability is zero. In practice, however, since the cellular environment has thermal noise and cross-correlations due to delayed waves of other users and of that channel itself, the search time must be set longer to obtain a satisfactory synchronization detection probability. Taking account of this, however, it is obvious that the acquisition time can be greatly reduced in the present invention as compared with the conventional serial search of the long codes.

Figure 9:
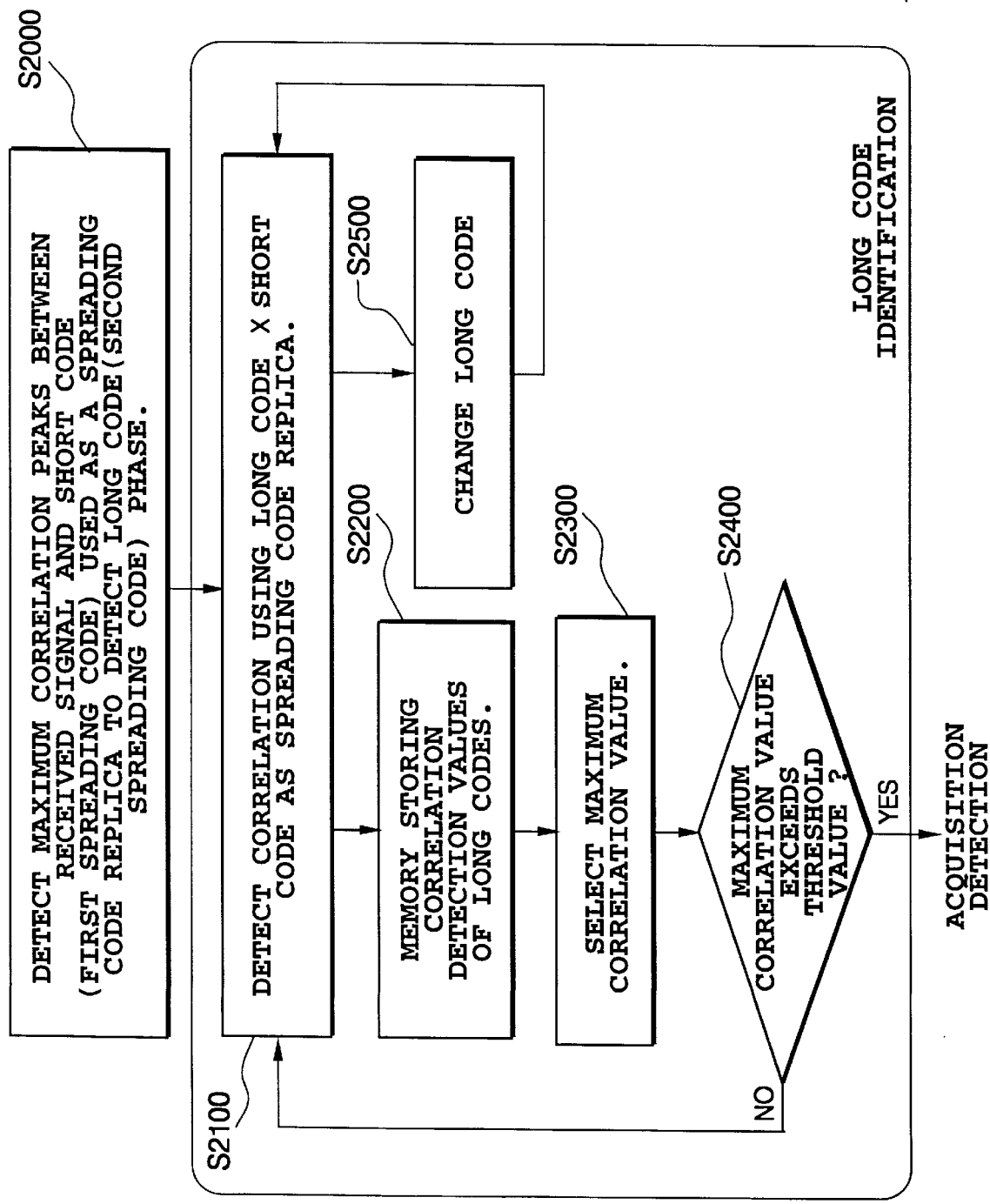
FIG. 9 is a diagram illustrating the operation of the present invention.

FIG. 9 illustrates the operation algorithm associated with claims 5 and 6 of the present invention. The mobile station first carries out correlation detection between the received signal and the short code (first spreading code) used as the spreading code replica to detect the phase of the received long code (second spreading code) from the timing of the maximum peak at step S2000. The operation is termed "long code phase detection" from now on. Subsequently, the mobile station detects, for the detected received long code phase, the correlation between the received signal and a code obtained by multiplying the long code and short code (called "long code short code" from now on), which is used as the spreading code replica, in order to identify the types of the received long code at step S2100. The procedures of steps S2100–S2400 will be called "long code identification" below. Thus, detected correlation values of respective long codes are stored in a memory at step S2200, and the maximum correlation value is selected at step S2300.

Furthermore, in claim 6, a threshold value decision is made for the maximum correlation value at step S2400. If the maximum correlation value exceeds the threshold value, a decision is made that the present spreading code replica is the received spreading code, thus completing the spreading code synchronization. Unless the maximum correlation value exceeds the threshold value, the long code identification is repeated as shown in FIG. 9, or the spreading code synchronization detection is carried out after changing the long code at step S2500. After completing the correlation detection with the entire long codes defined in the system, a decision is made that the long code which gives the maximum correlation value is the very long code used for spreading the received signal. In the foregoing description in connection with FIG. 9 and others, the operation is described in the case where the mobile station decides the cell to be connected at the initial stage of the communication. The mobile station can also deal with the search of the contiguous cells for carrying out the handover by setting the number of the phases to be detected in the long code phase detection to the number of the cells, and by making a decision that the types of the long codes determined through the correlation detection in the long code phase identification are the long codes used by the contiguous cells of which the currently connected cell notifies.

Figure 10:
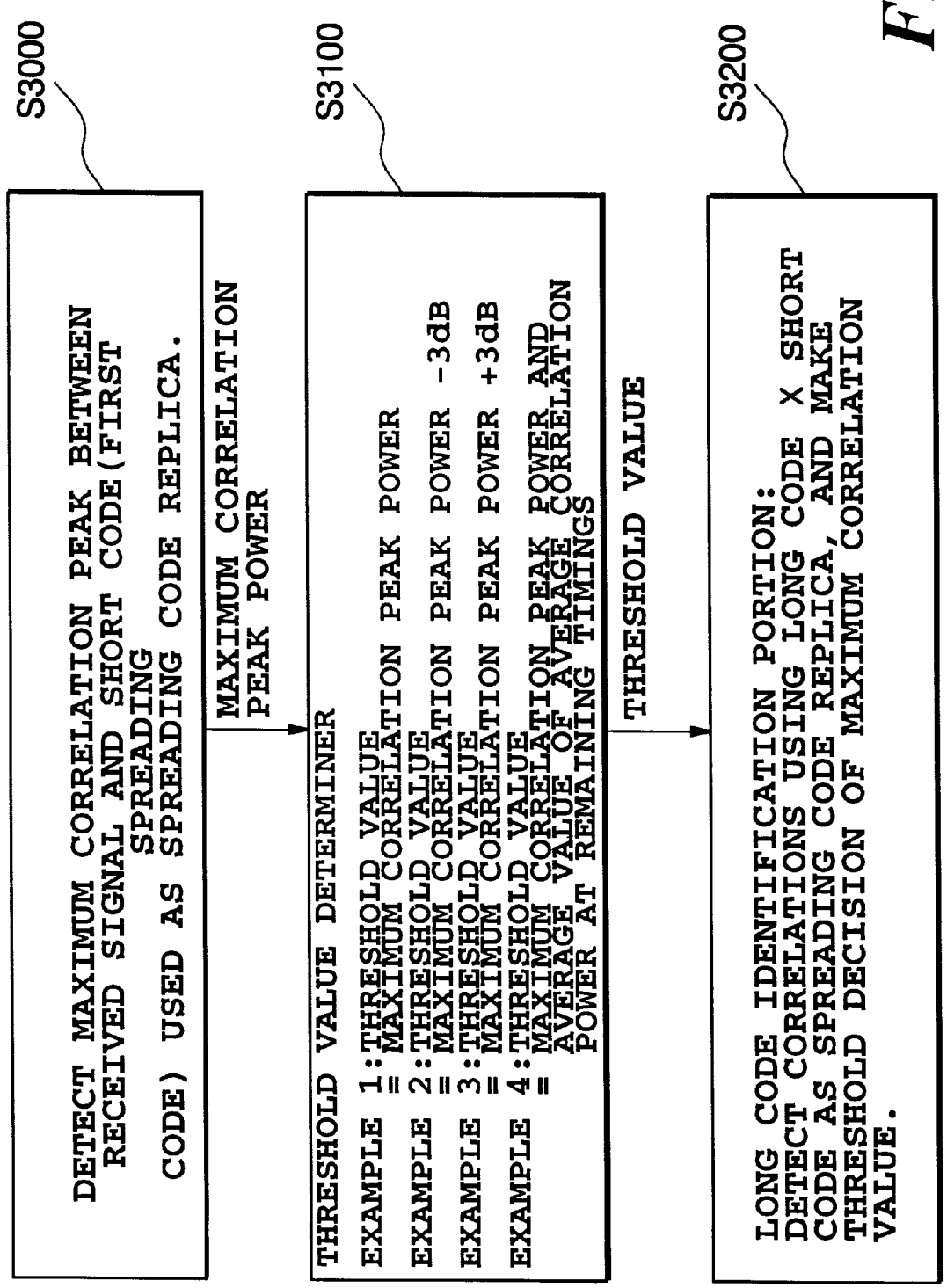
FIG. 10 is a diagram illustrating another algorithm of the present invention.

FIG. 10 illustrates the operation algorithm of claim 7 of the present invention. In the long code identification associated with claim 6 of the present invention, the threshold value decision is made of the maximum correlation value which is detected using the respective long code short code as the spreading code replica. The threshold value here is determined in terms of the correlation peak obtained in the long code phase detection as illustrated in examples 1–3 in FIG. 10, or in terms of the correlation peak and the average value of the remaining correlations as in example 4. This makes it possible to set a threshold value matching the received signal level at the mobile station (S3000–S3100). The present invention can also be effectively applied to the case where correlation values are detected in the long code identification decision at step S3200 using the long codes short code as the spreading code replica, and the correlation values are sequentially subjected to the threshold value decision. In claim 7 of the present invention, the mobile station can also achieve the search of the contiguous cells for carrying out handover by making identification decision using the threshold values corresponding to the respective peak values.

Figure 11:
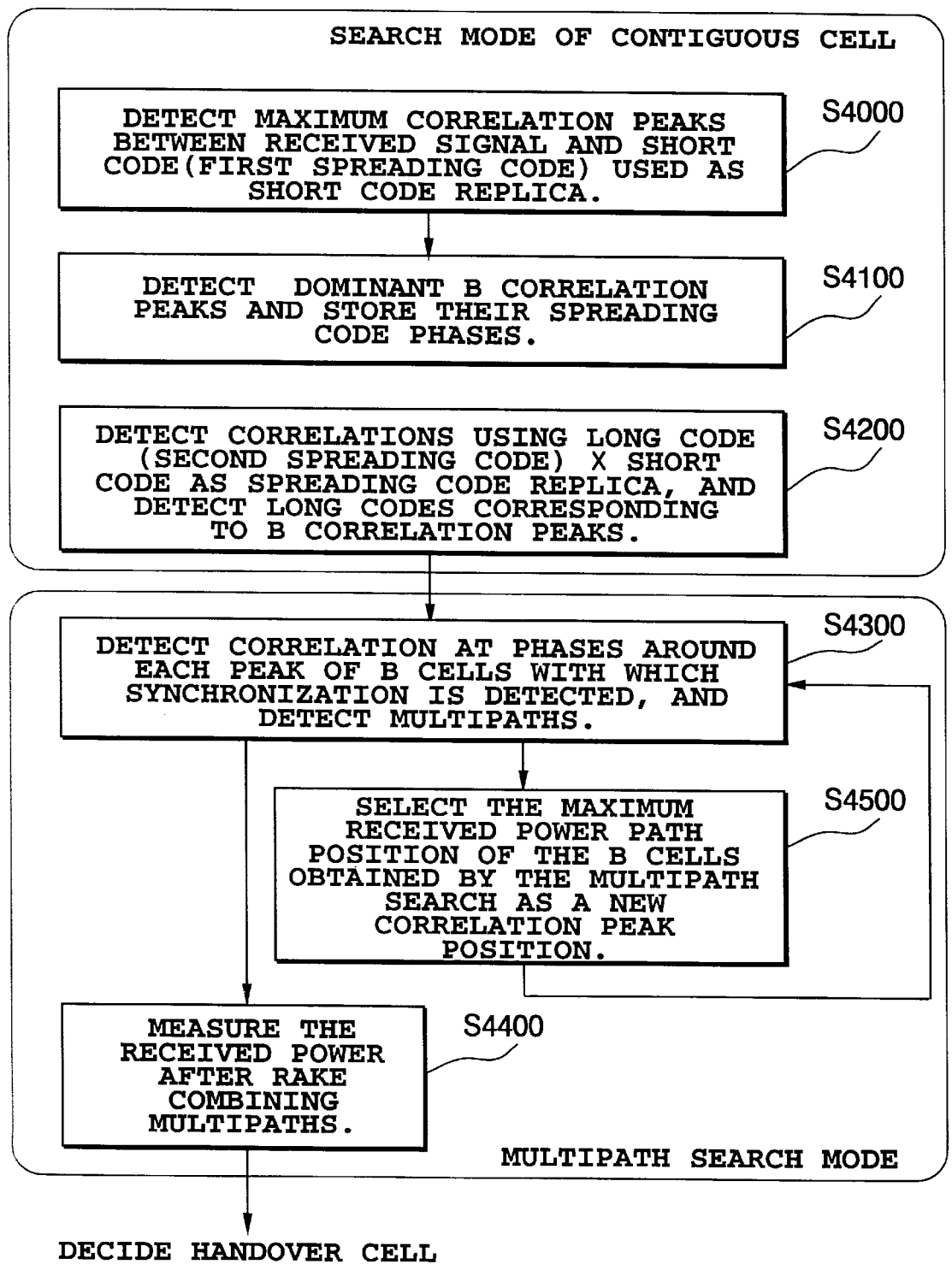
FIG. 11 is a diagram illustrating another algorithm of the present invention.

FIG. 11 illustrates the operation algorithm of claim 8 of the present invention, which relates to the search mode for implementing the spreading code synchronization with the contiguous cells. This algorithm selects the handover cell in accordance with the magnitude of the received power which must be actually decided by the resultant total received power of signals received through the multipaths from the respective cells. In addition, since the profiles of the multipaths, that is, the received power and phases of the paths vary, it is necessary for measuring the sum total of the received power of the entire paths to detect the delays of the multipaths of the contiguous cells at a fixed interval.

As illustrated in FIG. 11, the multipath search in the contiguous cell is carried out as follows, where B is the number of the contiguous cells. When the multipath search is carried out for the first time, B correlation peak detected phases are obtained by the long code synchronized phase detection at steps S4000 and S4100, and the long codes are detected which correspond to the B correlation peak detected phases at step S4200. Subsequently, the presence and absence of the multipaths is detected by detecting the long code correlation at phases around each of the B synchronized phases at step S4300. Thus, the handover cell is determined from the resultant power of the multipaths of the B cells at step S4400. However, since the delay profiles of the multipaths usually fluctuate with time, the multipath search must be carried out periodically, in which case of the present invention, the long code synchronized phase detection using the mask symbols is skipped in the second and the following multipath searches. Instead, the search is carried out around the previous multipath positions at step S4500. This makes it possible to save power when the matched filter consuming much current is used for the long code synchronized phase detection.

In claim 9 of the present invention, when using the frame structure which consecutively transmits two or more symbols which are spread by only the short code without the long code spreading, the multipath search is not performed at receiving timings of these symbols. This is because the multipaths cannot be identified which have a delay exceeding the short code period equal to the information symbol period when the spreading has been performed by only the short code.

Figure 12:
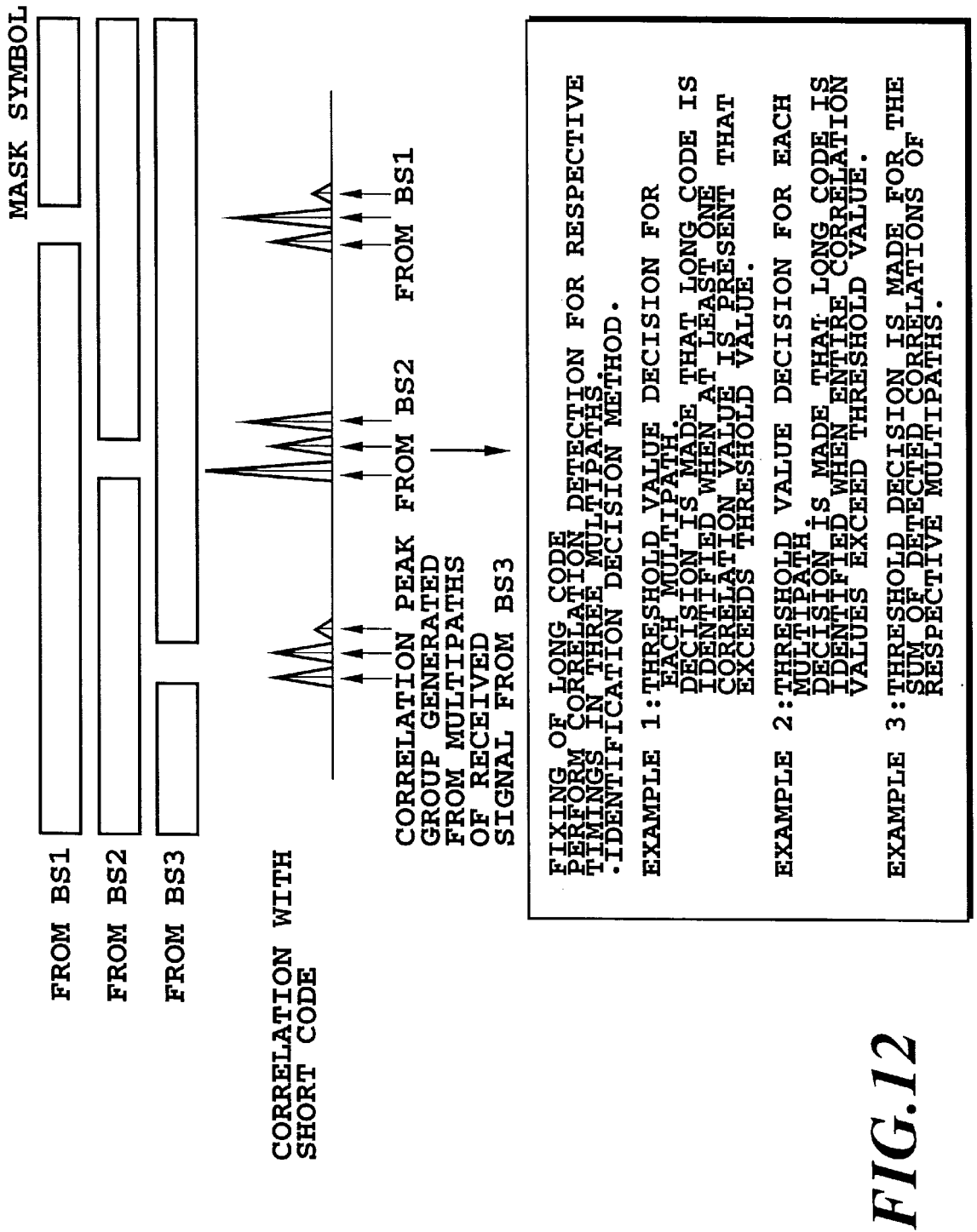
FIG. 12 is a diagram illustrating another algorithm of the present invention.

FIG. 12 illustrates the operation associated with claim 22 of the present invention. As shown in FIG. 12, the received signals from the cells are usually received with different delay profiles of the multipaths. In view of this, in the present invention, peaks due to multipaths are decided by detecting correlation peak groups which present in a particular time range around the maximum correlation peak obtained by the long code phase detection as shown in FIG. 12. The long code identification after this detects correlations for the plurality of the correlation peaks in parallel, and uses the correlation values as illustrated in FIG. 12 as overall decision materials. The contiguous cell search during the handover is achieved by carrying out the foregoing operation by detecting the individual peaks of the multipaths for the correlation peaks corresponding to the cells. The present invention can improve the detection accuracy of the spreading code synchronization under the multipath environment.

Figure 13:
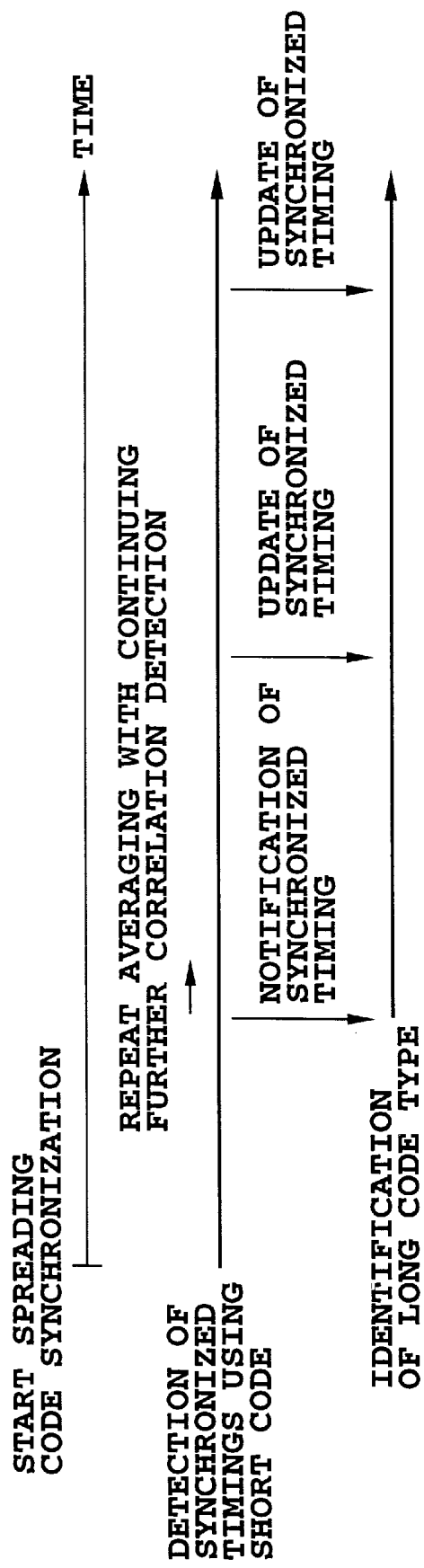
FIG. 13 is a diagram illustrating another algorithm of the present invention.

FIG. 13 illustrates the operation associated with claim 12 of the present invention. This aspect of the present invention carries out the long code synchronized phase (timing) detection and the long code identification at the same time except at the start of the spreading code synchronization detection. Referring to FIG. 13, the initial long code synchronized phase detection is carried out at first. Once the synchronized phase has been detected, the long code identification is started, although the long code synchronized phase detection is continued throughout the operation. The long code synchronized phase detection can improve its accuracy by repeating the averaging as shown in FIG. 13, or restart the synchronized phase detection after the reset of the averaging. If the long code is not identified, and hence the spreading code synchronization cannot be detected, the long code synchronized phase is updated periodically.

Figure 14:
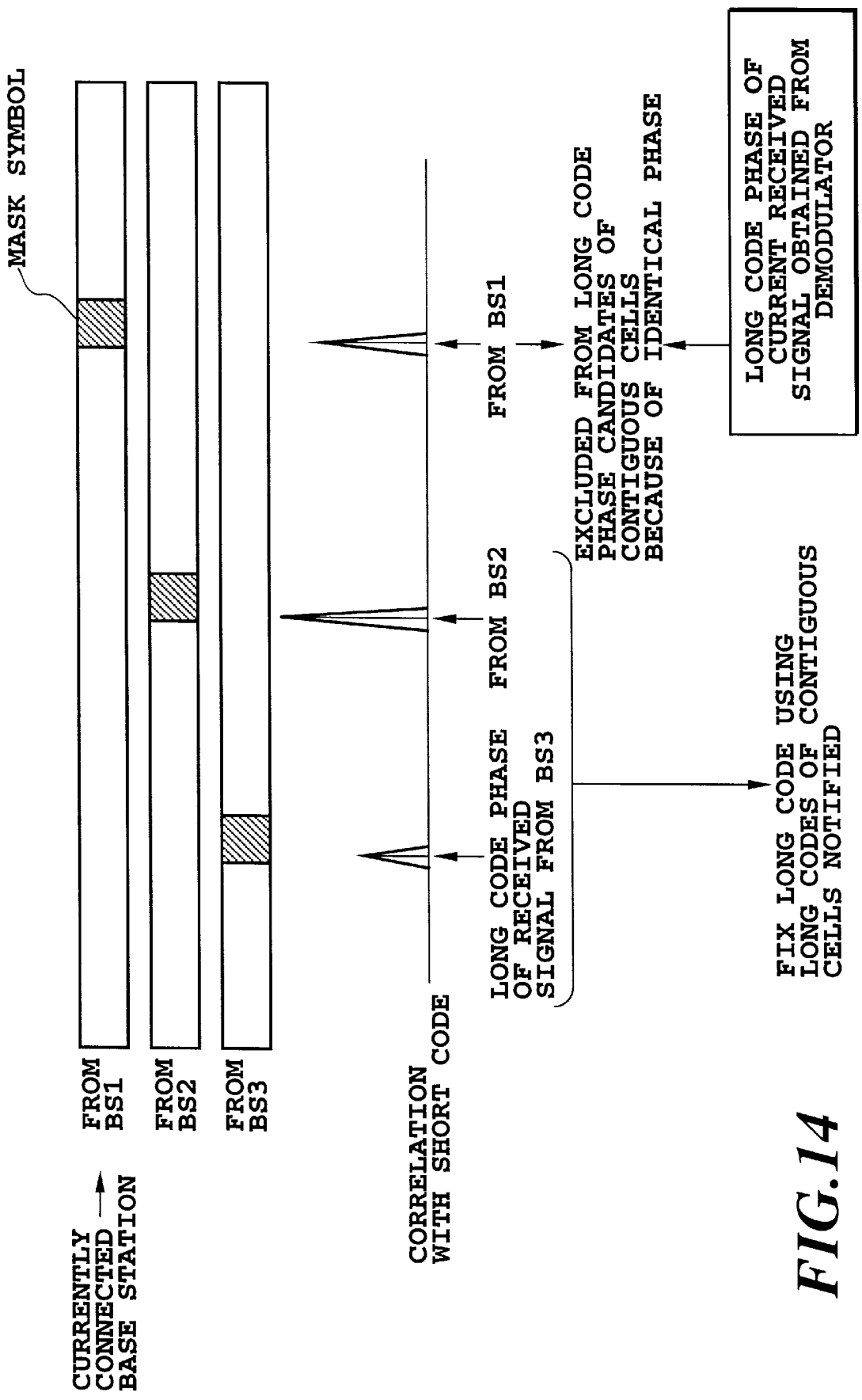
FIG. 14 is a diagram illustrating another algorithm of the present invention.

FIG. 14 illustrates the operation associated with claim 13 of the present invention. When the mobile station detects the correlation between the short code and the received signal in the long code phase detection for searching the contiguous cells to be handed-over during communications, the correlation peak obtained from the current channel is also included (the signal from BS1 in FIG. 14). The correlation peak of the current channel can be identified by detecting timings of the correlation peaks with respect to the long code phase of the current channel. The mobile station carries out long code identifications for the correlation peaks other than the correlation peak of the current channel.

Figure 15:
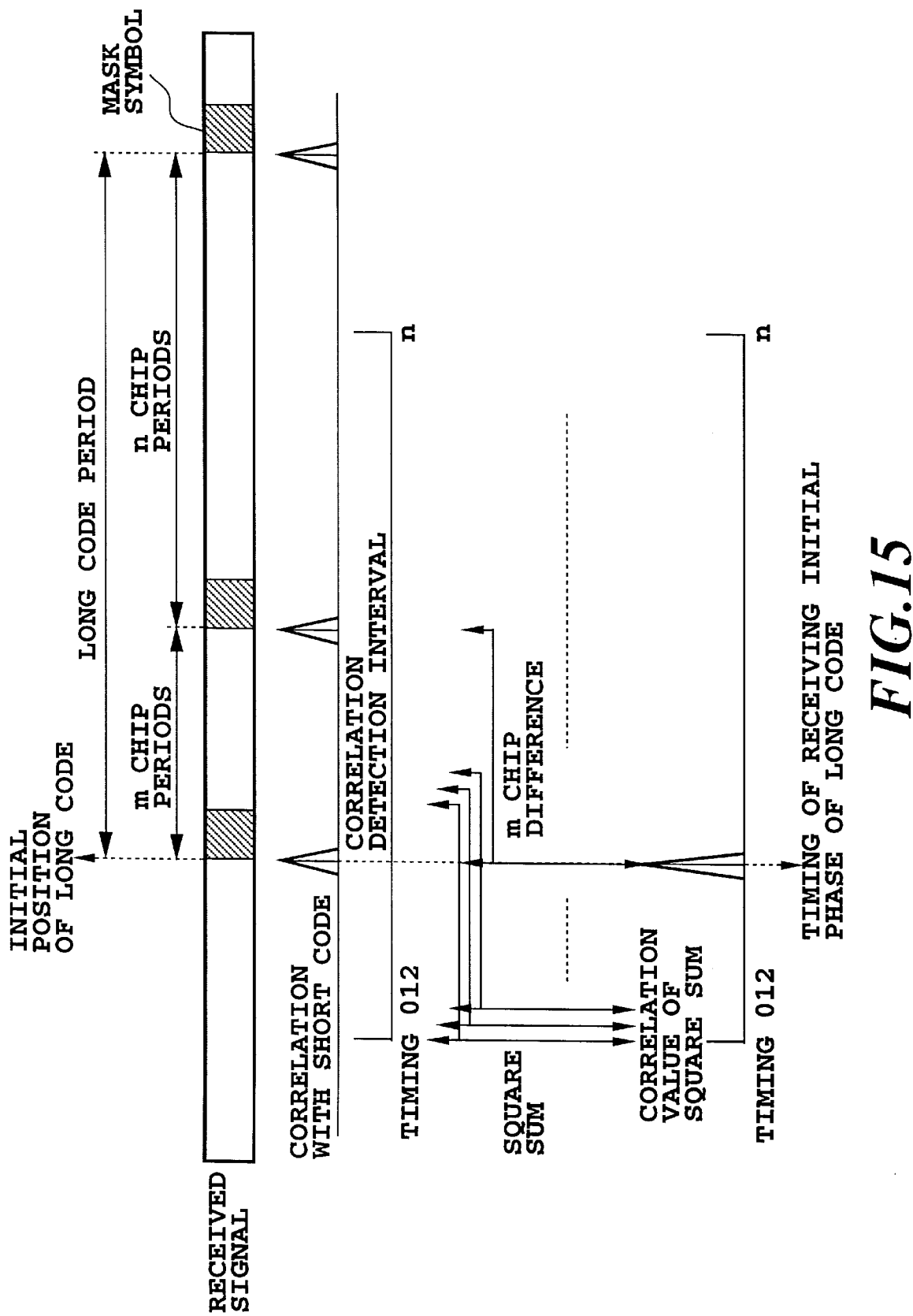
FIG. 15 is a diagram illustrating another algorithm of the present invention.

FIG. 15 illustrates the operation associated with claims 14, 15 and 16 of the present invention. As shown in FIG. 15, increasing the number of mask symbols assigned to one long code period enables the correlation averaging under the presence of noise, interface and fading to be achieved in one long code period, thereby improving the accuracy of the long code synchronized phase detection. In FIG. 15, two sets of mask symbols are present in one long code period, and the spaces between them are m:n as defined in claim 15 of the present invention. If m=n, that is, m=n=half the long code period, the correlation peak with the short code is detected every half the long code interval. As a result, it is necessary to decide whether the timing detected by a long code identification portion corresponds to the initial position or middle position of the long code. On the contrary, when m differs from n, the mobile station can uniquely detect the timing of receiving the initial phase of the long code from the detection timings of the correlation peaks occurring at uneven intervals. More specifically, after detecting the correlation values with the short code at each timings in one long code period as shown in FIG. 15 (correlation values are also available which are obtained by averaging over a plurality of long code periods), the square sum correlation value at timing t is defined as the sum total of the squares of correlations obtained at timings t and (t+m chips), where the timing (t+m chips) can be smaller than the timing t because the timing (t+m chips) is expressed in terms of a number modulo n where n=long code period. Then, the timing giving the maximum square sum is decided as the timing for receiving the initial phase of the long code.

Figure 16:
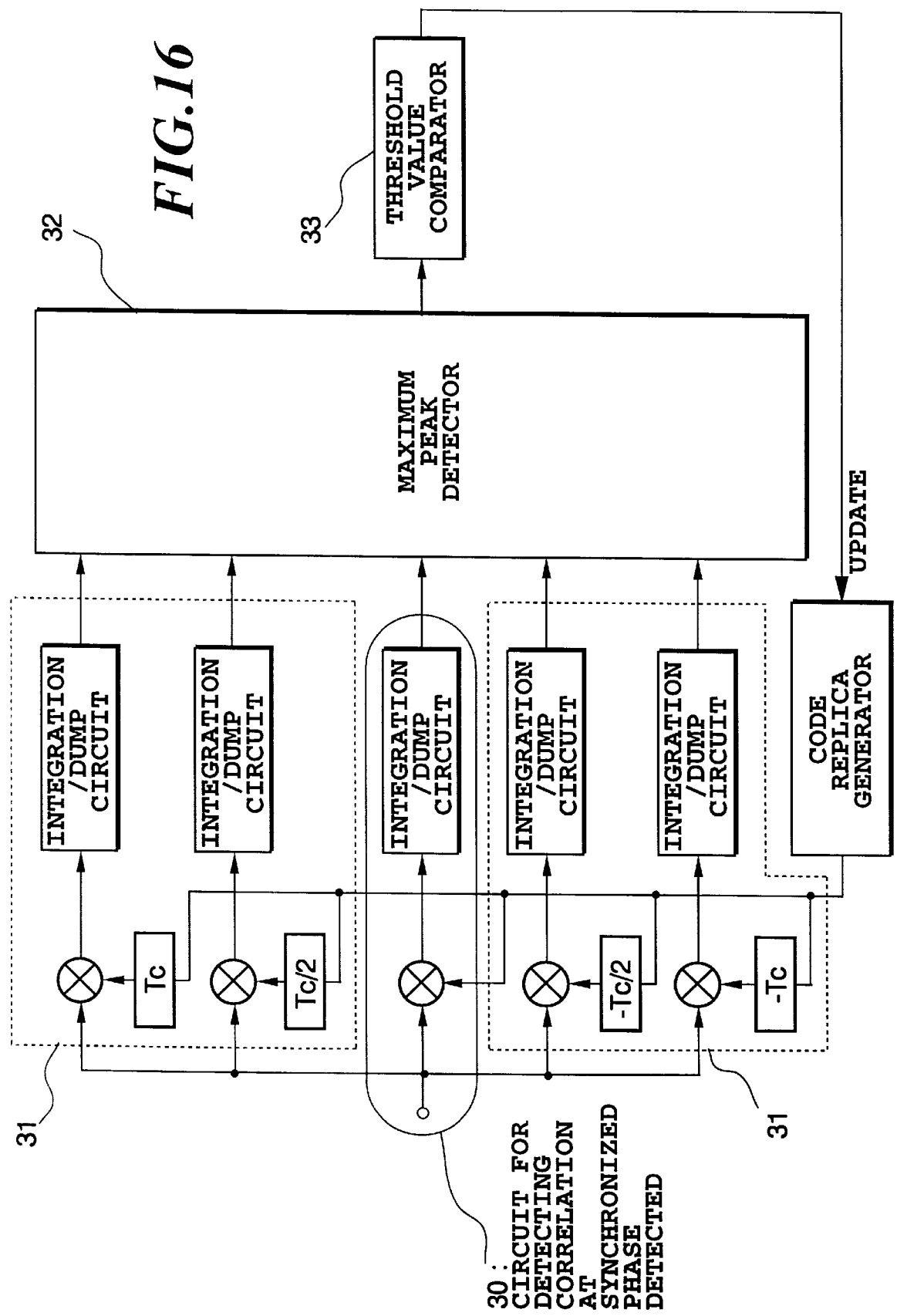
FIG. 16 is a block diagram showing another configuration for the spreading code synchronization processing in the receiver in accordance with the present invention.

FIG. 16 illustrates the operation associated with claim 17 of the present invention. When the clock of a receiver deviates from that of a transmitter, the synchronized position seems to shift from the viewpoint of the receiver because the sampling timing of the received signal shifts with time. Accordingly, the long code identification will come to be made at phases deviating from the true synchronized phase detected by the long code synchronized phase detection as time elapses. This will degrade the accuracy and speed of the spreading code synchronization. In view of this, the long code identification associated with claim 17 of the present invention is implemented by correlators 31 as shown in FIG. 16. Specifically, the correlators 31 have their phases shifted by Δ which corresponds to aTc, where a is a real number and Tc is a chip period, and carries out the correlation detection in parallel with the detecting operation by a circuit 30 for detecting correlation at the synchronized phase detected by the long code synchronized phase detection (in FIG. 16, phases are shifted by ±Tc/2 and ±Tc). After that, a maximum peak detector 32 detects the maximum correlation value from a plurality of correlation values obtained, and a threshold value comparator 33 uses them for making the long code identifying decision. With such a configuration, the synchronized phase deviation due to the shift of the sampling position during the long code identification can be compensated for if the deviation is within one chip. An increasing number of correlators enables the deviation of the synchronized position to be handled in a wider range.

Claims 18–21 will now be explained, in which a "short code" refers to the "first spreading code" in claims 18–21, a "long code" refers to the "second spreading code" in claims 18–21, "shared short codes" refer to the "shared first spreading codes in the first spreading code group, which are used in common by the base stations" in claims 18–21, and "group codes" refer to the "unshared first spreading codes corresponding to the respective second spreading codes used by the base stations".

FIGS. 23A and 23B illustrate a transmission frame structure in accordance with claim 19 of the present invention, where N (#1 to #N) is the number of the long codes belonging to long code groups. A case will be described in which the entire long codes are divided into A groups in accordance with claim 19, that is, the number of long codes per group is N/A. Each base station decides a group code in accordance with the long code used.

In an example 1, each of A (A=3 in FIG. 23B) short codes in a short code group is assigned to each one of A group codes (#1–#A). Each base station transmits at its transmission timing a group code #x corresponding to one of the long code groups such as a group code #1 when using one of the long codes #1–#(N/A), a group code #2 when using one of the long codes #(N/A+1)–#(2N/A), and so on.

In example 2, a case in which A=3 will be described to facilitate understanding. Unlike in the example 1, two short codes in the short code group are assigned to group codes #1 and #2 in the example 2. Then, each base station carries out transmission as follows depending on the long code it employs.

When the long code belongs to the long code group 1: always transmits a group code #1.

When the long code belongs to the long code group 2: always transmits a group code #2.

When the long code belongs to the long code group 3: transmits the group codes #1 and #2 alternately, As described above, the long code groups can be represented in terms of transmission patterns of the group code or codes (numbers). In other words, the example 1 corresponds to a case which arranges the entire transmission patterns using a single group code in the example 2.

In FIGS. 23A and 23B, the transmission timings of the group code coincide with the transmission timings of the shared short code at which the long code is masked. The transmission timings have a merit as follows. Using orthogonal code sequences as the short code group can keep orthogonality between transmission channels of the base stations. Masking the long code, however, will corrupt the orthogonality at the mask timings, thereby resulting in interference to other channels. This holds true for the transmission of the group codes. Thus, the occurrence frequency of the interference will be reduced by matching the timings of masking the long codes, that is, by matching the transmission timings of the shared short codes and those of the group codes. Here, these timings can be set at any known timings at the mobile station side. Furthermore, the number of transmission times of the shared short code per one long code period and that of the group code can be freely set.

Figure 24:
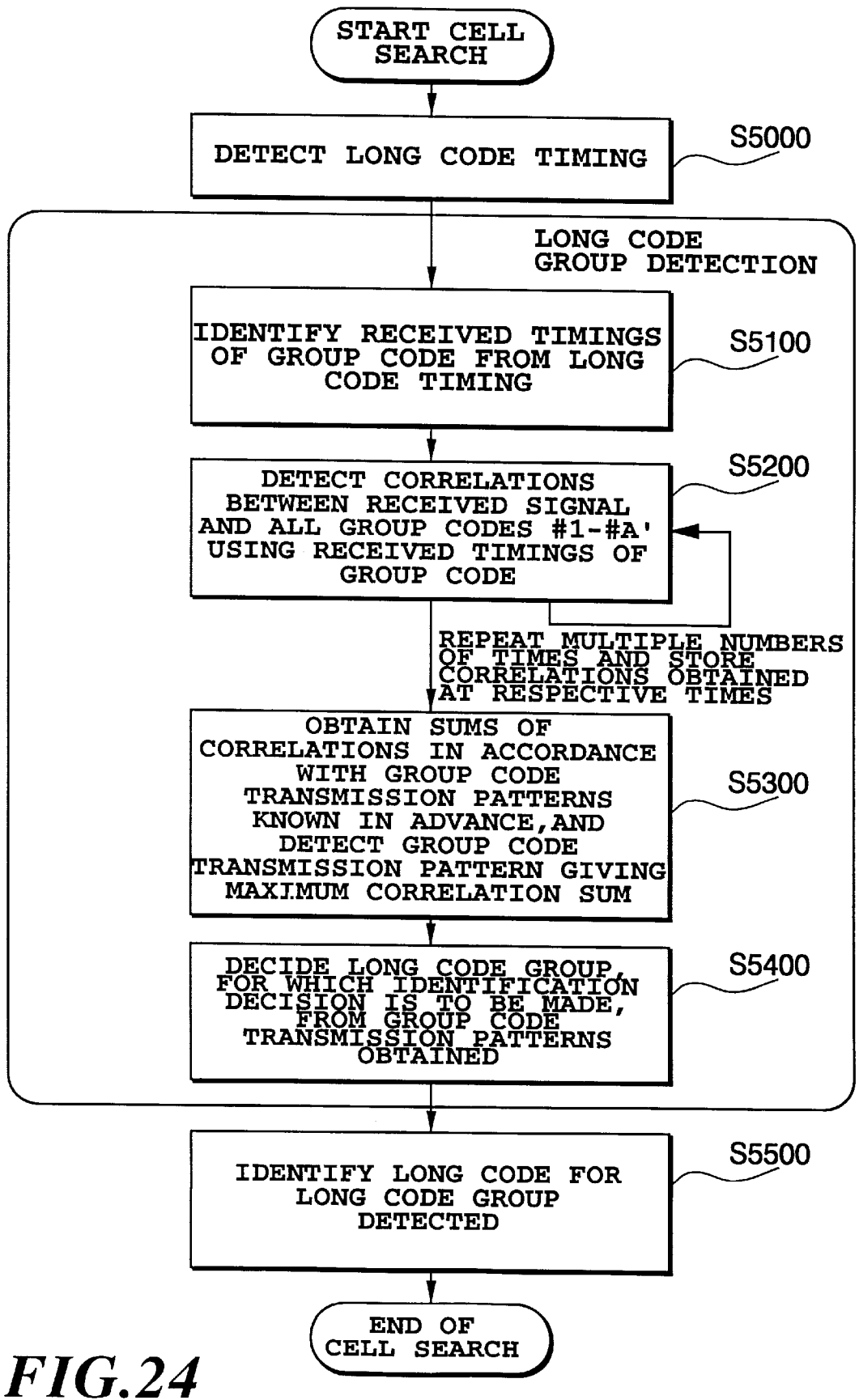
FIG. 24 is a diagram illustrating an algorithm of the spreading code synchronization method associated with claim 20 of the present invention.

FIG. 24 illustrates an algorithm of a spreading code synchronization (cell search) method associated with claim 20 of the present invention. The mobile station detects the received timing of the long code at step S5100 by detecting correlations between the received signal and the shared short code in accordance with the long code synchronized phase detection of FIGS. 7, 17 and 20. Then, the mobile station obtains at step S5100 the received timings of a group code, which are known from the received timing of the long code. Subsequently, the mobile station detects at step S5200 the correlation between the received signal and each of A' group codes at the obtained timings. Here, since one of the A' group codes is actually included in the received signal, the correlation becomes maximum for the group code included in the received signal when comparing the correlations obtained by using the group codes as a replica code. The mobile station detects the correlation values at multiple numbers (X) of the group code received timings equal to or greater than the repetition period T of the transmission pattern, and stores them in the memory. The correlation values obtained are represented by $$S(a,x)$$

where a is the number of a group code used for the correlation detection, satisfying $1 \leq a \leq A'$, x is a serial number corresponding to the received timings of the group codes, satisfying $1 \leq x \leq X$, and the correlation values are those after the square-law detection, hence $S \geq 0$. The transmission patterns of group codes for respective long code groups, which are known to the mobile station, are represented as $$P(i,j)$$

where i denotes the long code groups and $1 \leq i \leq A$, and j denotes the transmitted timings and $1 \leq j \leq T$.

In the example 1 of FIG. 23B, A=A'=3, T=1, and P(1,1)=1, P(2,1)=1 and P(3,1)=1. In the example 2 of FIG. 23B, A=3, A'=2, T=2, and P(1,j)=1 regardless of j, P(2,1)=1, P(2,2)=2 and P(3,j)=1 regardless of j. The mobile station obtains the correlation sum D(i) for the transmission pattern candidates after correlation detection.

$$D(i) = \sum_{x=1}^{X} S\{P(i,x), x\}$$

When i equals the group number which includes the long code used for spreading the received signal, D(i) becomes maximum because matching of the transmission pattern of the group code is established in this case (S5300). Thus, the mobile station can detect the number of the group code the base station has transmitted by comparing the magnitude of D(i), thereby deciding the long code group including long code candidates to be used in the next long code identification at step (S5400). Although the long code identification is carried out as in the foregoing spreading code synchronization methods of the present invention at step S5500, the number of long codes to be identified is reduced to N/A from the conventional number N. This makes it possible to reduce the time taken for the identification decision, and hence the total time taken for the spreading code synchronization.

Figure 26:
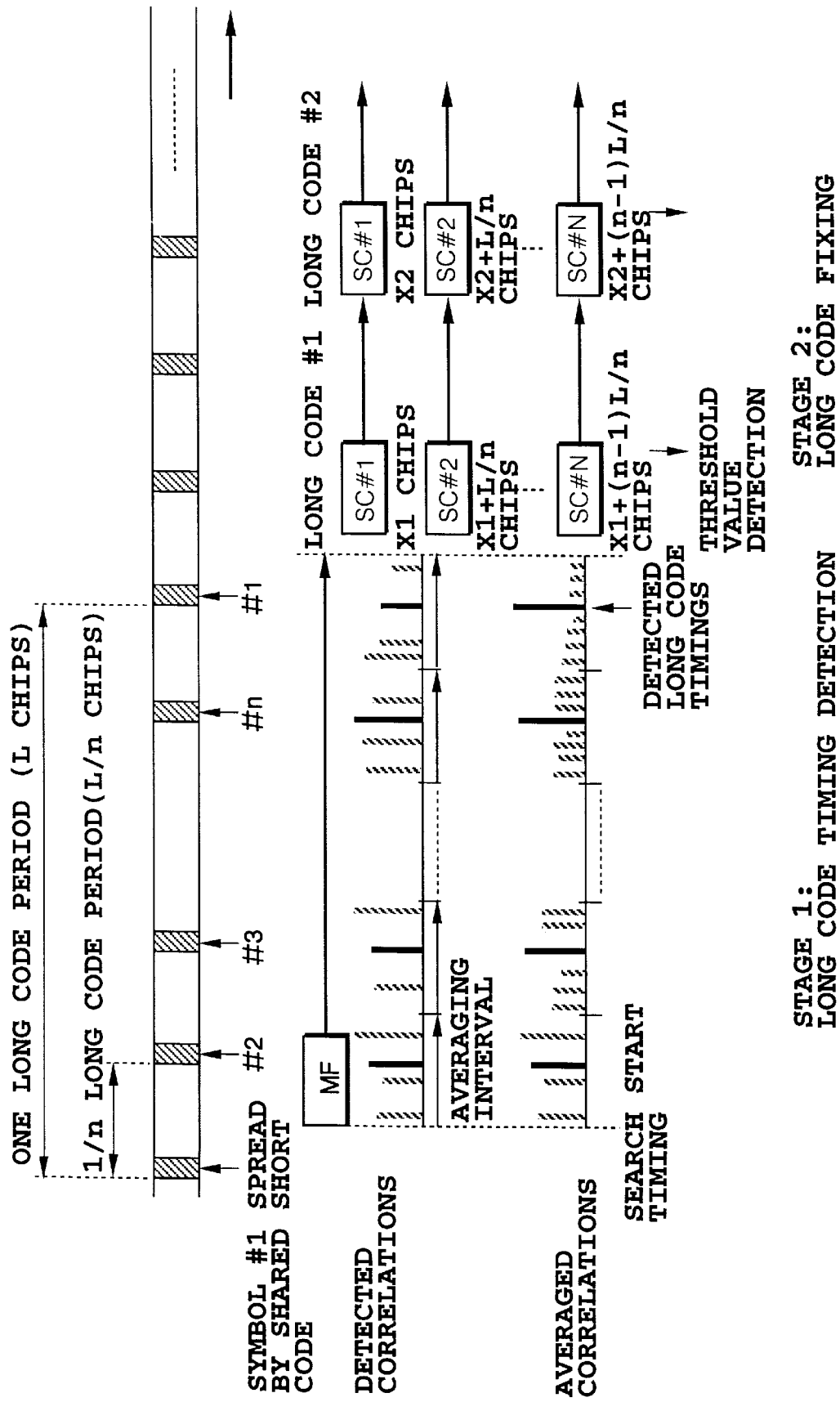
FIG. 26 is a diagram illustrating a frame structure in accordance with claim 18 and an algorithm of the spreading code synchronization method in accordance with claim 20 of the present invention.

FIG. 26 illustrates the algorithm of the spreading code synchronization method associated with claim 21 of the present invention, which has the same frame structure as that associated with claim 18 of the present invention. In FIG. 26, symbols spread by only a shared short code are placed at the same intervals (L/n chip intervals) for every one long code period (L chips). The basic operation of a mobile station corresponding to this frame is illustrated in the lower part of FIG. 26. In the long code timing detection, the timing of the received long code is detected from the timing giving the maximum correlation values between the received signal and the shared short code, which are detected as in the spreading code synchronization method associated with claim 20. In the mobile station, however, since the symbols which are spread by only the shared short code are received at every L/n chip interval, the section for observing the correlation values can be set at L/n chips at the shortest. Likewise, although it is necessary for the averaging of the correlations, which is carried out for the purpose of improving the accuracy of the correlations detected by averaging the noise or interference, to obtain the average of the correlation values for one long code period (L chip period) in the other spreading code synchronization methods according to the present invention, the averaging of the correlation values in this case can be achieved at every L/n chip interval. In other words, the aspect of the present invention has an advantage of reducing the memory capacity by a factor of n which is required for storing the correlations in the long code timing detection. In this case, however, the long code timing obtained has n ambiguities. This will be described in connection with FIG. 26 in which symbol #1 spread by the shared short code is located at the initial position of the long code. If the mobile station can detect the received timing of the symbol #1 spread by the shared short code, this will uniquely determine the long code timing. In the frame structure according to the aspect of the present invention, however, if the symbol #1 spread by the short code is received at time Tm, the timings of receiving the symbol #1 will occur at n timings such as Tm, Tm+L/n chip periods, Tm+2L/n chip periods, . . . , and Tm+(n−1)L/n chip periods. This ambiguity of received timings of the long code is cleared up in the process of identifying the long code. Specifically, detecting the correlations between the received signal and the replicas of the long code at the phases X1+L/n, X1+2L/n, . . . , X1+(n−1)L/n besides X1 makes it possible to identify one of the correlation values having the greatest value (that is, the spreading code which has been established) as long as the long code replicas are the same as the long code which spreads the received signal, where X1 is the synchronized chip phase of the long code (the correlation detection time of the long code #1 in FIG. 26) which is obtained from the time Tm of receiving the symbol spread by the shared short code, which Tm in turn is obtained in the long code timing detection. This means that it is possible for the correlation detection between the received signal and the n code replicas whose code phases are shifted by L/n chips from one another in the long code identification to achieve the identification of the long code and the establishment of the long code timing having n ambiguities.

EMBODIMENT

Figure 5:
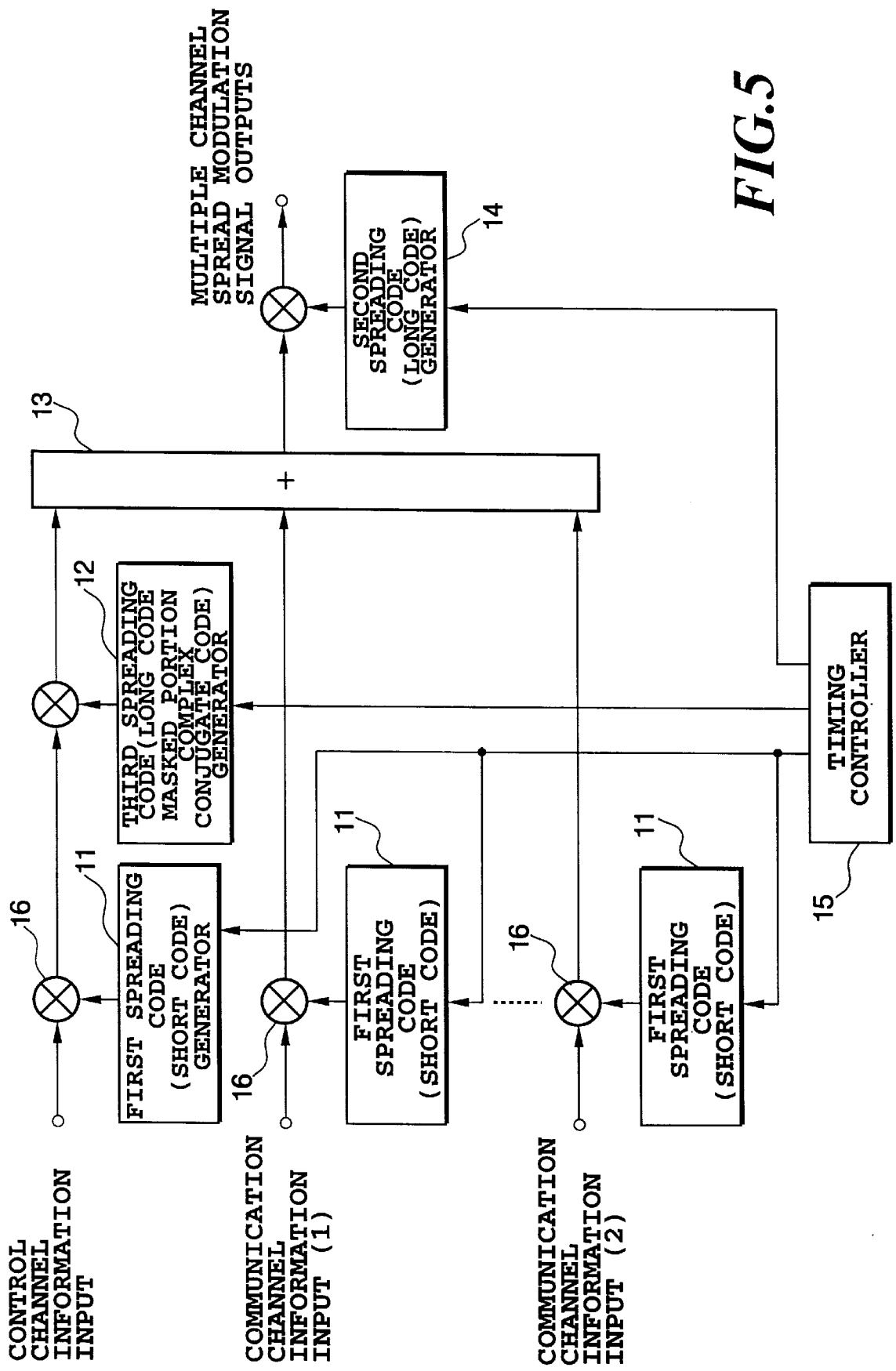
FIG. 5 is a block diagram showing an embodiment of a code spreading method in accordance with the present invention.

FIG. 5 shows a code spreading processor in a forward link transmitter in a base station of a cellular system, as an example of the code spreading scheme of the mobile communication system to which the present invention is applied. In the forward channels, the same long code is employed in common in each base station to facilitate handover. This enables the signal obtained by bundling together the control channels and traffic channels carrying out communications to be spread using the same long code, thereby enabling the long code spreading portion to be used in common. To implement the spreading modulation scheme of the control channel in accordance with claim 1 of the present invention, however, it is necessary for a second spreading code (long code) to be masked for M information symbols in each period of the long code. On the other hand, all the other traffic channels must be spread by the first spreading code (short code) and the second spreading code (long code) throughout the entire time, which is implemented by the code spreading scheme as shown in FIG. 5.

As shown in FIG. 5, the control channel information signal and the traffic channel information signals are each spread by first spreading codes which are fed from first spreading code (short code) generators 11, and which are different from one another and have a period equal to the information symbol period. Subsequently, only the control channel information symbol is spread by a third spreading code which is generated by a third spreading code (long code masked portion complex conjugate code) generator 12 and which is a complex conjugate of the long code (second spreading code) used in common for spreading. In addition, the signals of the entire channels are added at appropriate timings by an adder 13, and then spread by the second spreading code fed from a second spreading code (long code) generator 14, thereby being output as a spread modulation signal. A timing controller 15 controls the operation timings of the generators. The reference numeral 16 designates multipliers.

Thus, the control channel information has been multiplied in advance for the M information symbols by the complex conjugate code of the long code used in common for spreading, and then is multiplied along with the other traffic channels by the long code. As a result, the spreading by the long code is canceled out in the mask portions, resulting in spreading only by the short code. This configuration enables the long code spreading portion to be used in common to the entire control channels and traffic channels in the base station transmitter.

It will be understood that the code spreading processors of the forward channel transmitter associated with claims 14, 15, 18 and 19 can also be implemented by the configuration of FIG. 5 The present invention relates to the spreading code synchronization scheme of the long code which is carried out at with two stages of the spreading code synchronization method. The first step locates the spreading code position, and the second step identifies the type of the spreading code, that is, the base station.

Figure 7:
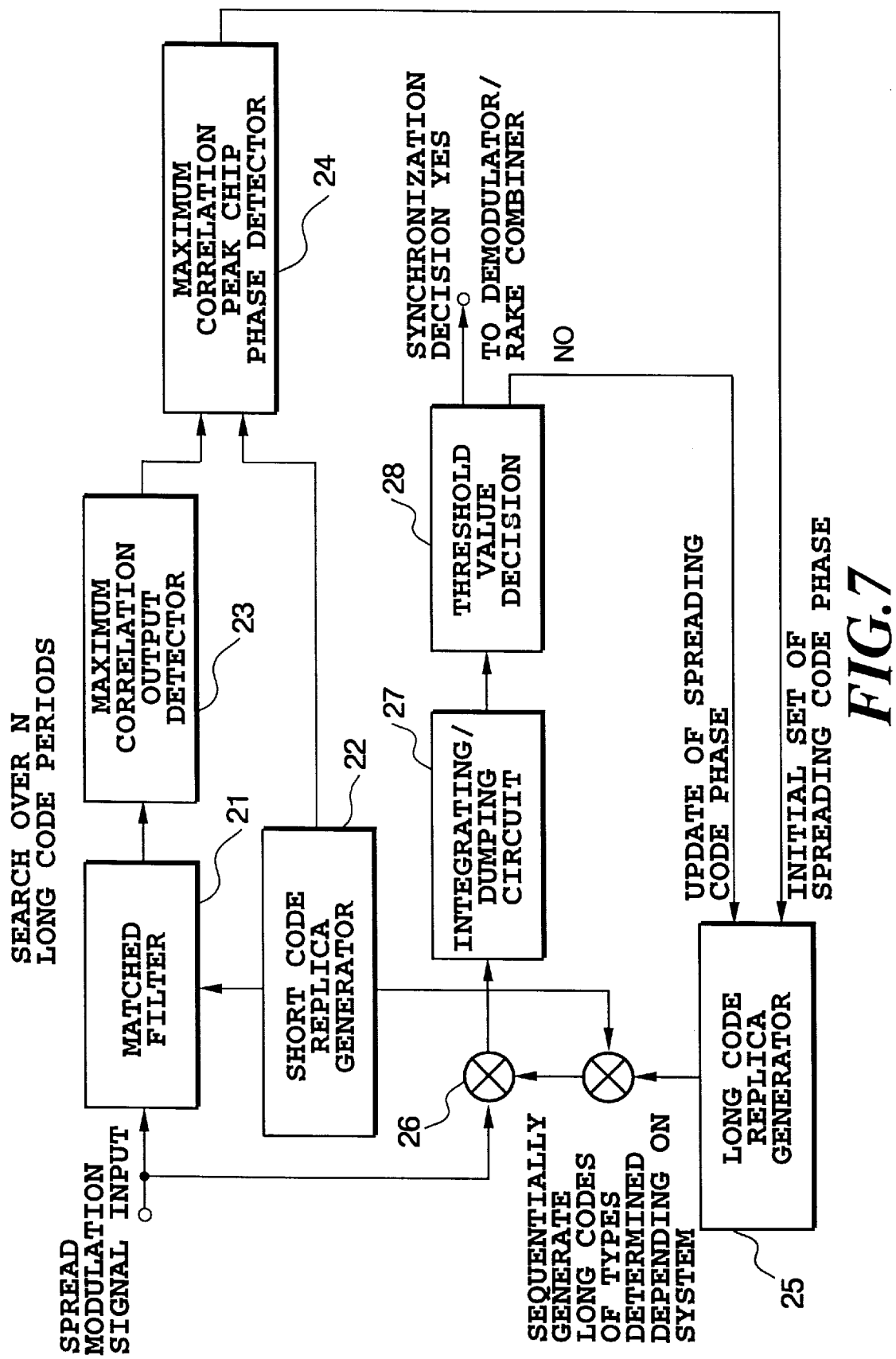
FIG. 7 is a block diagram showing a configuration for the spreading code synchronization processing in a receiver in accordance with the present invention.

FIG. 7 is a block diagram illustrating a function at the power up of the mobile station.

The spreading code replica fed to a matched filter 21 whose input is a received spread modulation signal is assumed to be a short code placed at the long code masked portions. The short code is shared by the base stations and is fed from the short code replica generator 22. The matched filter 21 detects the correlation between the received spread modulation signal and the spreading code replica over N long code periods, and a maximum correlation output detector 23 detects the chip phase giving a maximum correlation output.

The base station (transmitting side) determines in advance the long code phase following the long code masked portion, that is, the code phase spread by only the short code. Accordingly, the long code phase can be determined by detecting a maximum correlation peak phase by inputting to a maximum correlation peak chip phase detector 24 the output of the maximum correlation output detector 23 and the output of the short code replica generator 22.

However, since the base station to be connected, that is, the long code type to be used has not yet been determined at this stage, the second spreading code having the maximum correlation value must be determined by sequentially performing correlation detection on the codes obtained by multiplying the first spreading code by A long codes (A is a natural number) in the second spreading code group determined in advance in the system. The long code generated by a long code replica generator 25 which sequentially switching the long code types is multiplied by the short code fed from the short code replica generator 22. The product is multiplied by the spread modulation signal by a multiplier 26, followed by an integrating/dumping circuit 27. Subsequently, a threshold value decision circuit 28 makes a threshold decision, thereby identifying the long code type. Thus, the signal exceeding the threshold value is adopted as one whose synchronization decision has been established, and is supplied to a well-known demodulator/RAKE combiner. The long code replica generator 25 carries out the initial set of the spreading code phase in response to the detection signal fed from the maximum correlation peak chip phase detector 24, and switches the long code types in response to the signal which is fed from the threshold value decision circuit 28, and whose level is below the threshold value.

Figure 8:
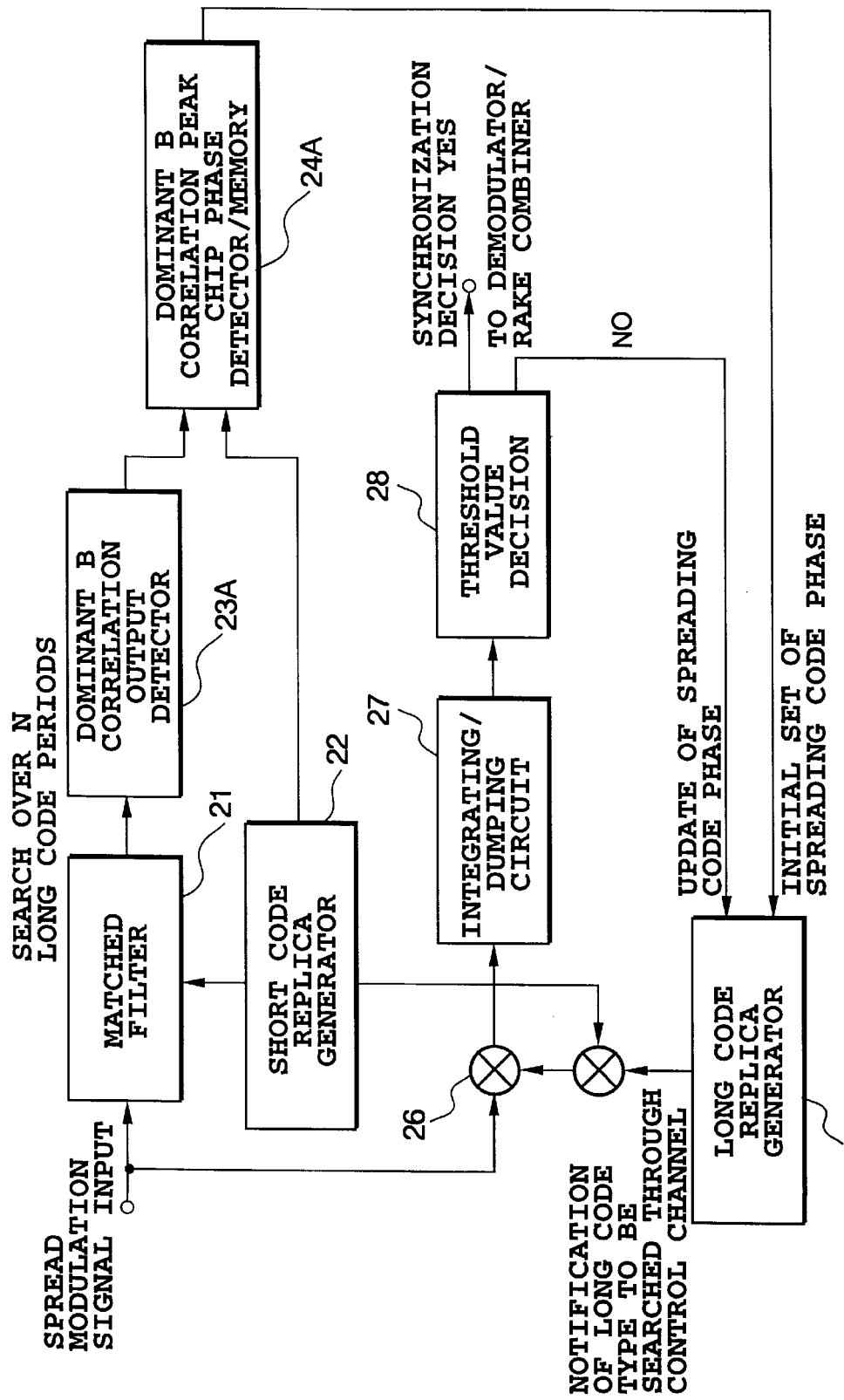
FIG. 8 is a block diagram showing another configuration for the spreading code synchronization processing in the receiver in accordance with the present invention.

FIG. 8 is a functional block diagram of a mobile station which searches the cell (base station) to which the channel is to be switched next with the movement of the mobile station. It carries out over the N long code periods the correlation detection of the short code at the portions in which the long code is masked as in FIG. 7. In FIG. 8, however, a detector 23A detects B dominant correlation outputs in descending order of magnitude from the output of the matched filter 21, and a detector/memory 24A detects the chip phases of the B dominant long codes and stores them. In addition, since the information about the long code types to be searched has been provided in advance to a long code replica generator 25A by the base station over the current control channel, the correlation detection and synchronization decision are made for B spreading codes. Thus, received signal levels are detected for the correlation outputs associated with B contiguous cells, followed by specifying the base station to which the channel is to be switched next.

Figure 17:
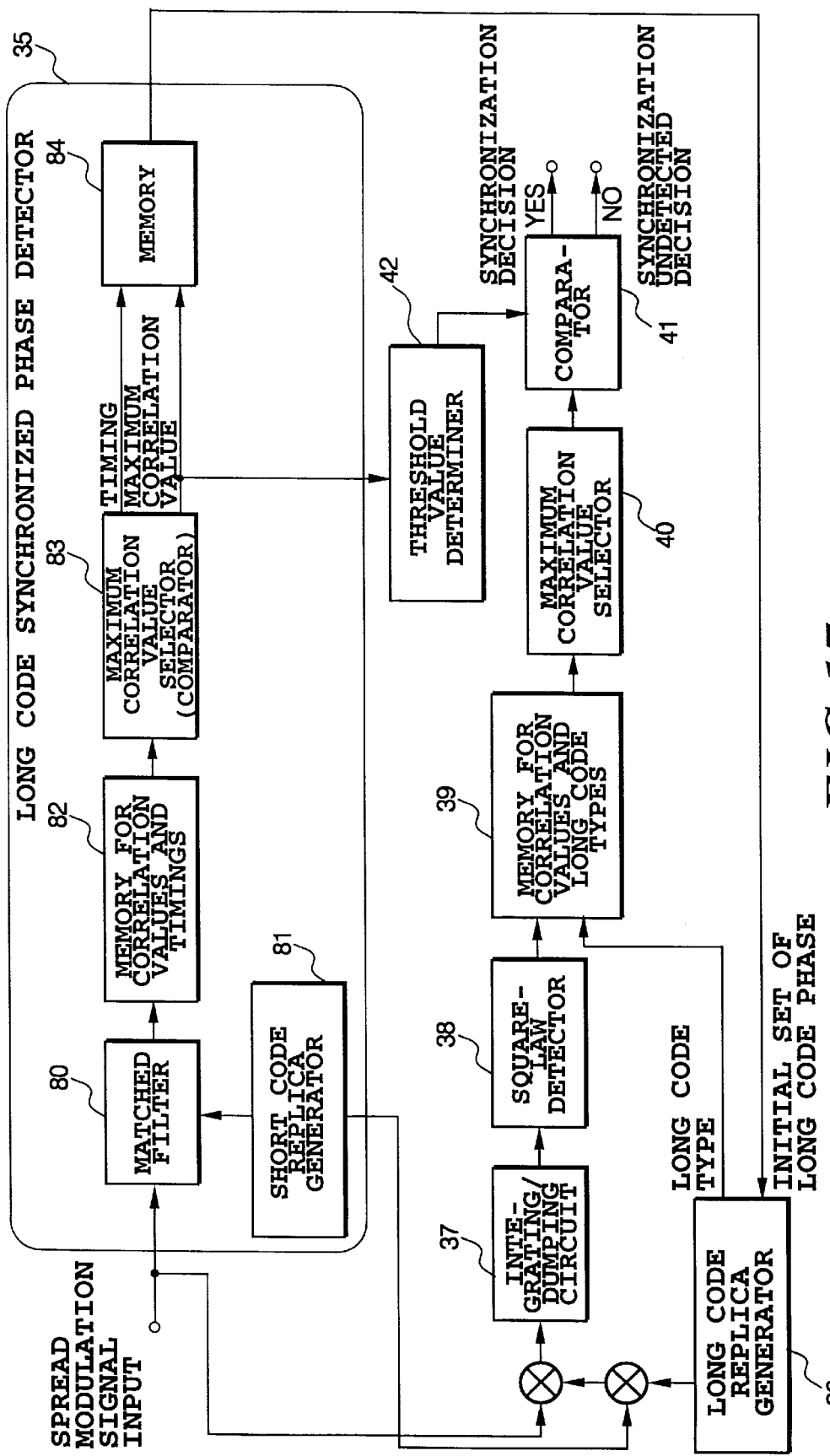
FIG. 17 is a block diagram showing another configuration for the spreading code synchronization processing in the receiver in accordance with the present invention.

FIG. 17 is a block diagram of a system corresponding to claims 5, 6 and 7, which operates as follows:

(With regard to claim 5)

1. A long code synchronized phase detector 35 detects the long code synchronized phase as the blocks 21–24 in FIG. 7. The reference numeral 80 designate a matched filter, 81 designates a short code replica generator, 82 designates a memory for correlation values and their timings, 83 designates a maximum correlation value selector (comparator) and 84 designates a memory.

2. The phase of a long code replica generator 36 is set at the synchronized phase detected by the circuit 35.

3. An integrating/dumping circuit 37 integrates the correlation between the received spread modulation signal and a code obtained by multiplying the long code fed from the long code replica generator 36 by the short code fed from the short code replica generator 81, and its output is square-law detected by a square-law detector 38. The resultant correlation value and its corresponding long code type fed from the long code replica generator 36 are stored in the memory 39.

4. The operation of the foregoing items 2 and 3 are repeated by changing the type of the long code fed from the long code replica generator 36.

5. After detecting correlation for the entire long codes, a maximum correlation value selector 40 decides the long code giving the maximum correlation value as the long code for spreading the received signal, thus completing the acquisition.

(With regard to claim 6)

In addition to the operation associated with claim 5, the synchronization detection is completed if a comparator 41 makes a decision that the maximum value exceeds a threshold value, otherwise the acquisition is continued.

(With regard to claim 7)

1. A threshold value determiner 42 is added for deciding the threshold value of claim 6 in response to the maximum correlation value detected by the long code synchronized phase detector 35.

Figure 18:
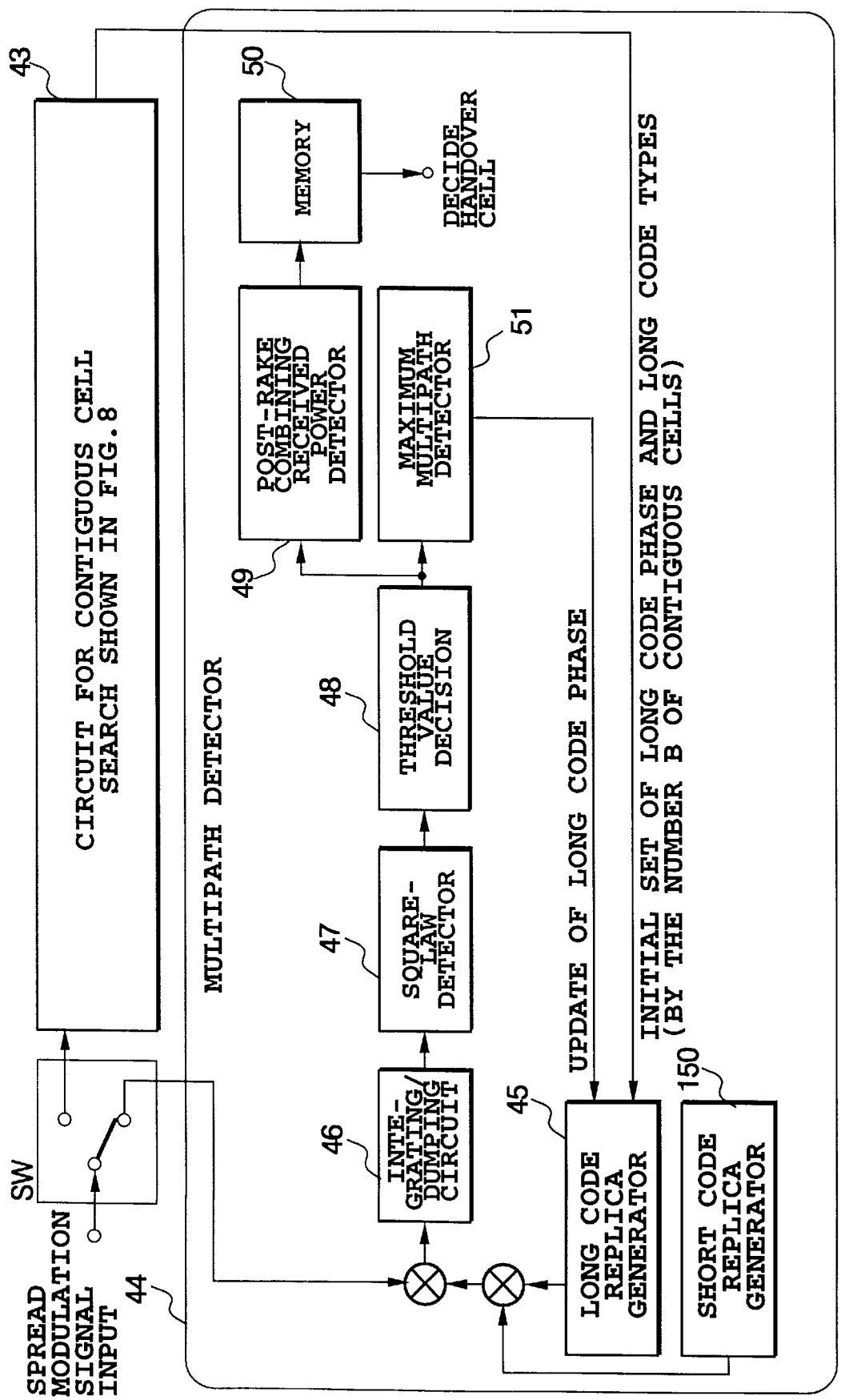
FIG. 18 is a block diagram showing another configuration for the spreading code synchronization processing in the receiver in accordance with the present invention.

FIG. 18 is a block diagram corresponding to claim 8, and operate s as follows:

1. As initial detection, a contiguous cell search circuit 43 as shown in FIG. 8 detects the synchronized long code phase and its long code type for each of B contiguous cells.

2. The synchronized long code phases and the long code types of the B contiguous cells are initially set in a long code replica generator 45 in a multipath detector 44.

3. The received signal except for that of the first step is input to the multipath detector 44 by transferring a switch SW.

4. Multipath search is carried out by detecting correlation around the synchronized long code phase using a long code replica matched to each contiguous cell.

5. The multipath decision is made by integrating by integrating/dumping circuit 46 the correlation between the received spread modulation signal and a code obtained by multiplying the long code fed from the long code replica generator 45 by a short code fed from a short code replica generator 150, by square-law detecting its output through a square-law detector 47, and by making threshold decision of the power output from the square-law detector 47 by a threshold value decision circuit 48.

6. A post-RAKE combining received power detector 49 makes a RAKE combining (path diversity) of the multipaths which exceed the threshold value, measures the received power and stores the measured power in a memory 50.

7. A maximum multipath detector 51 detects the phase of the long code which gives the maximum power multipath of each cell.

8. After measuring the received power of all the contiguous cells, the cell giving the maximum post-RAKE combining received power is decided as the handover cell.

9. The output of the maximum multipath detector 51 is input to the long code replica generator 45 to update its long code phase to a newly synchronized long code phase which is equal to the long code phase of the maximum multipath among the contiguous cells.

10. Repeat the operation of item 3 and onward at fixed intervals.

Figure 19B:
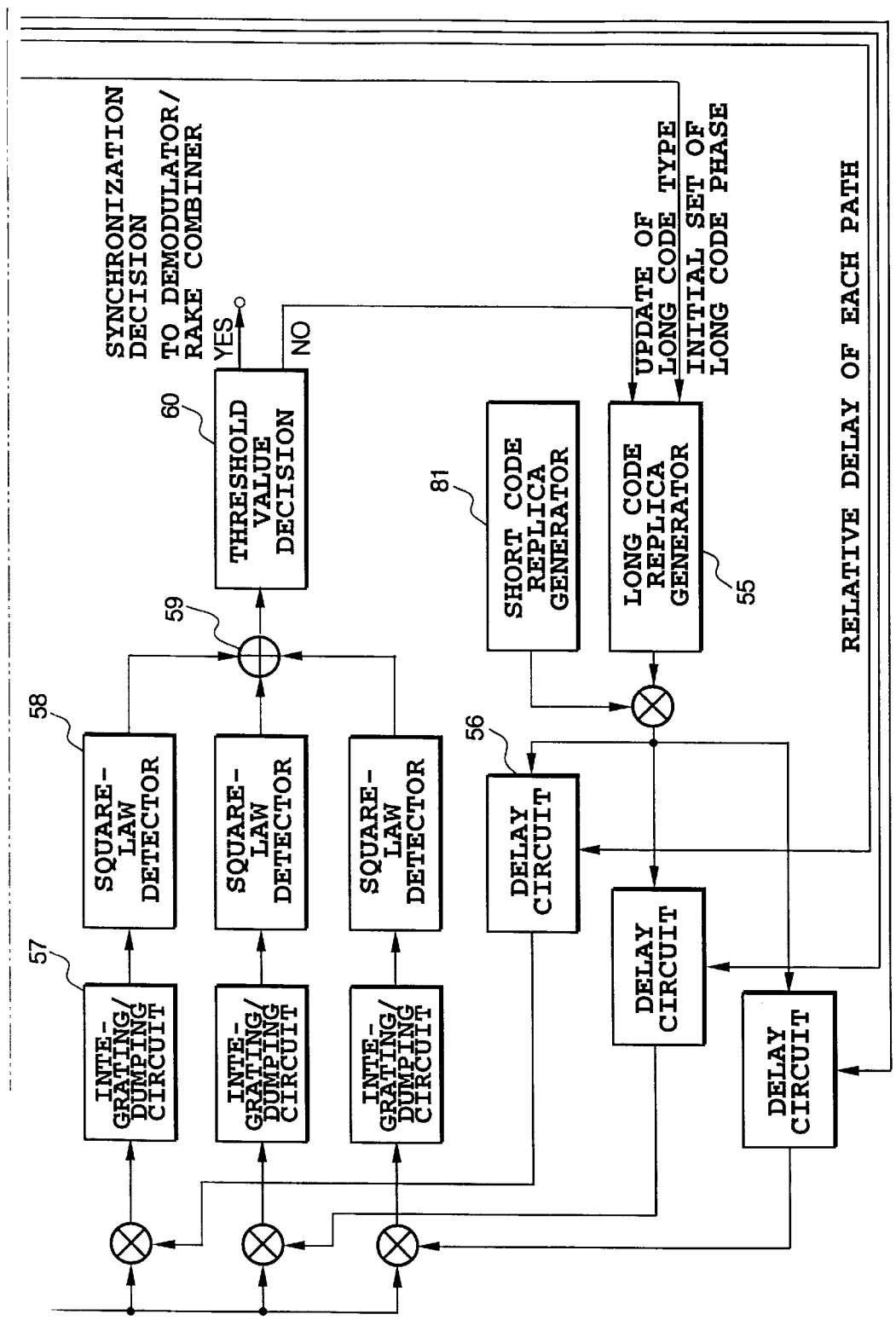
FIG. 19B is a block diagram showing the circuits other than that of FIG. 19A in the block diagram showing another configuration for the spreading code synchronization processing in the receiver in accordance with the present invention.

FIGS. 19A and 19B are block diagrams corresponding to claim 22, which operates as follows.

1. A selector 53 in a long code synchronized phase detector 52 detects not only a maximum correlation value but also its neighboring (within one symbol period, for example) correlation peaks.

2. A memory 84 stores phase differences (relative delays) between the long code synchronized phase obtained from the timing giving the maximum correlation value and the neighboring correlation peaks (paths).

3. The detected long code synchronized phase is set in a long code replica generator 55, relative delays of the paths are set in delay circuits 56, and the long code fed from the long code replica generator 55 is multiplied by the short code fed from a short code replica generator 81.

4. Correlations, which are detected between the received spread modulation signal and the codes with relative delays provided by the delay circuits delaying the product of the long code and the short code, are integrated and square-law detected through integrating/dumping circuits 57 and square-law detectors 58, and are added by an adder 59.

5. A threshold value decision circuit 60 makes a threshold decision of the relative power obtained as the addition result, and decides whether the synchronization has been established or not. When not yet established, the operation of item 4 is repeated with changing the type of the long code.

6. (In claim 5, the maximum value is selected after detecting the correlation power obtained as a result of the addition for each long code.)

Figure 20:
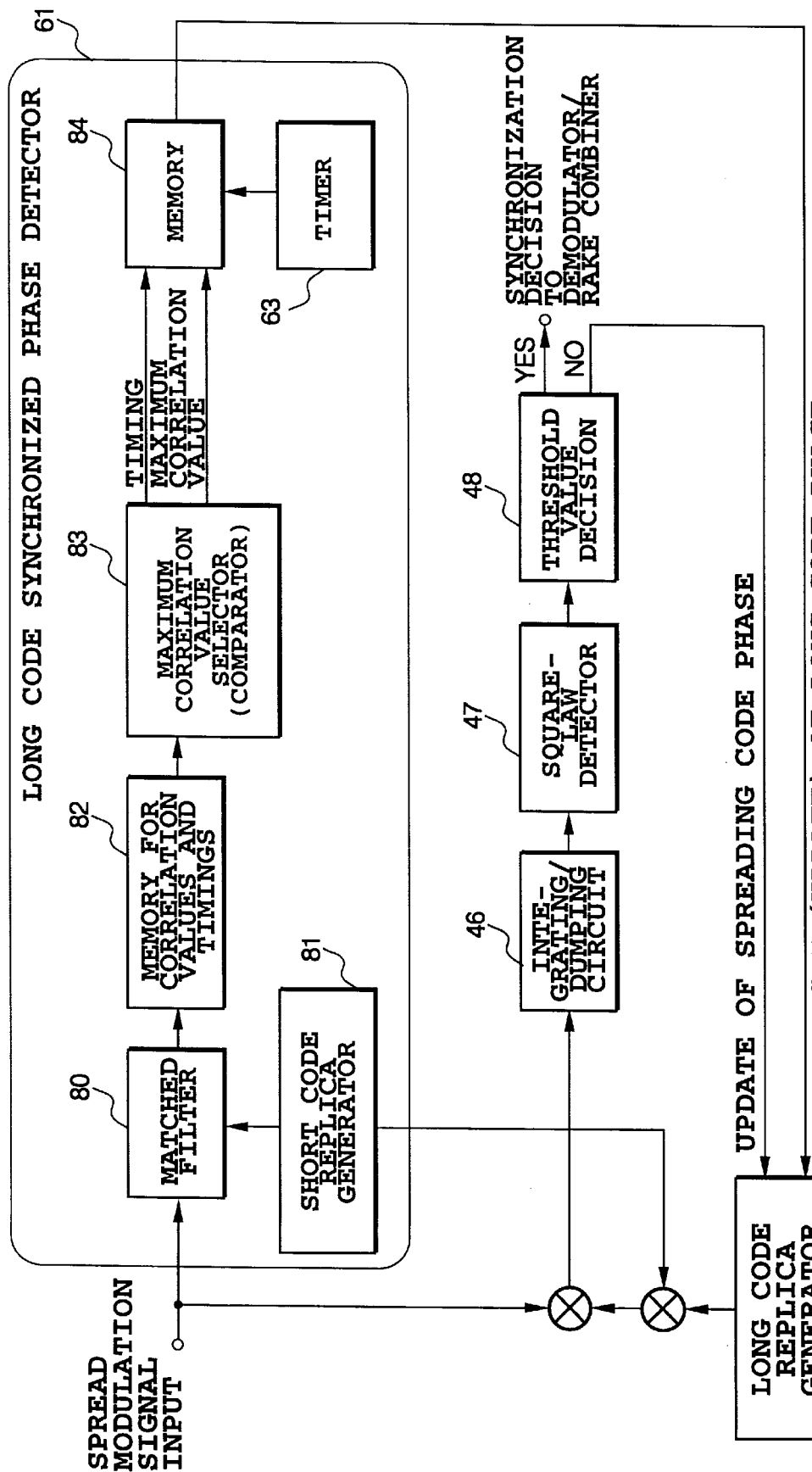
FIG. 20 is a block diagram showing another configuration for the spreading code synchronization processing in the receiver in accordance with the present invention.

FIG. 20 is a block diagram corresponding to claim 12, which operates as follows.

1. At the initial acquisition stage, a long code synchronized phase detector 61 operates for detecting the long code synchronized phase.

2. A long code replica generator 62 is initially set at the detected long code synchronized phase so that the long code identification is carried out. The long code synchronized phase detection is continued as well.

3. The long code synchronized phase detector 61 includes a timer 63 so that the most recently detected long code synchronized phase is set in the long code replica generator 62.

4. The same steps as those of other claims are taken for making correlation detection between the received spread modulation signal and the codes obtained by multiplying the long codes fed from the long code replica generator 62 and the short code fed from a short code replica generator 81.

Figure 21:
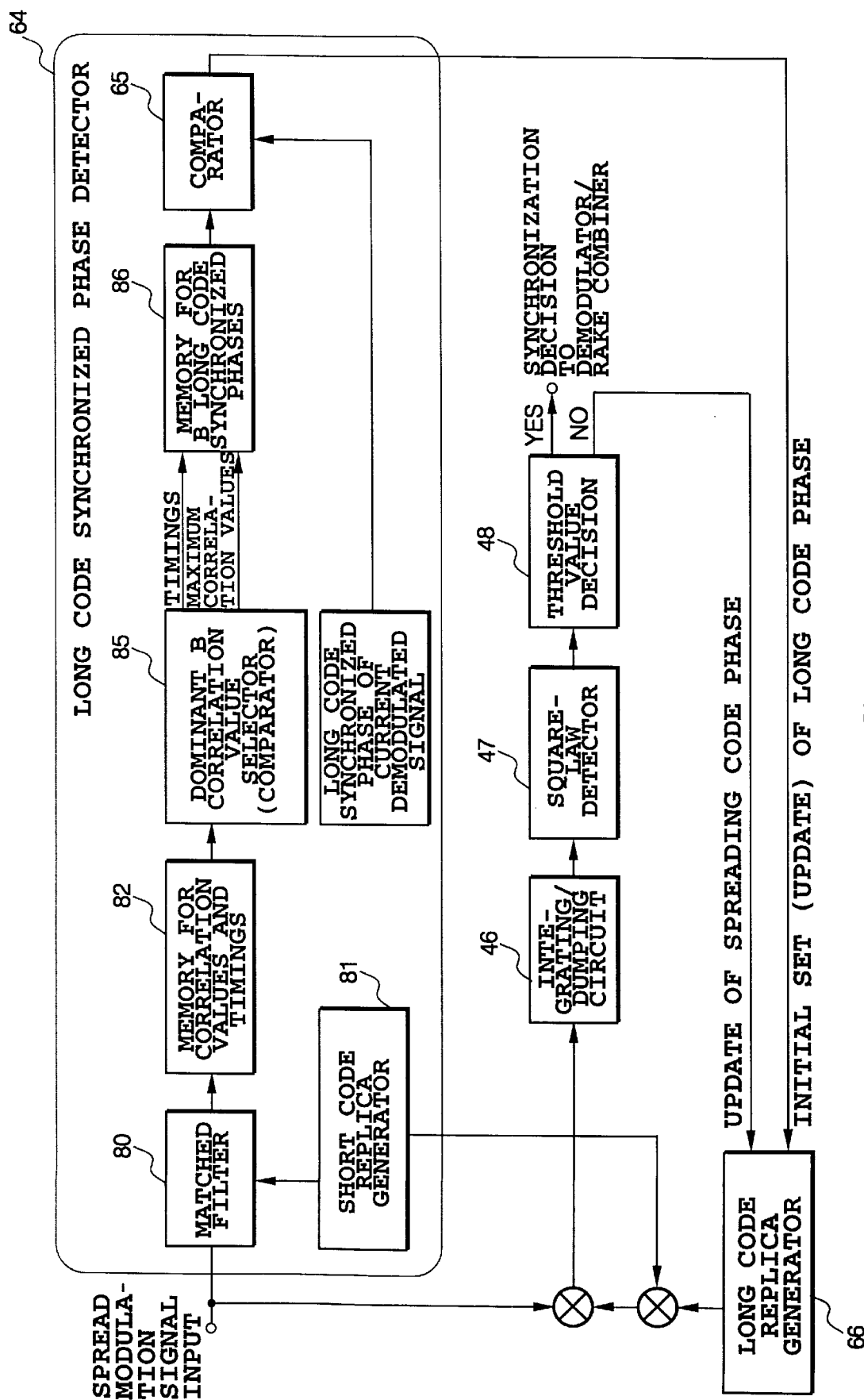
FIG. 21 is a block diagram showing another configuration for the spreading code synchronization processing in the receiver in accordance with the present invention.

FIG. 21 is a block diagram corresponding to claim 13, which operates as follows.

1. A long code synchronized phase detector 64 includes in addition to the circuit as shown in FIG. 8 a comparator 65 for comparing B long code synchronized phases with the long code synchronized phase of a signal being demodulated now. The reference numeral 85 designates a dominant B correlation value selector (comparator), and 86 designates a memory for storing B long code synchronized phases.

2. As a result of comparison by the comparator 65, if B detected long code synchronized phases coincide with the long code synchronized phase of the current demodulation signal, these phases are not input to a long code replica generator 66.

With regard to claims 14 and 15, FIG. 5 illustrates them, in which the timing controller 15 has a plurality of mask symbols generated at various timings.

Figure 22:
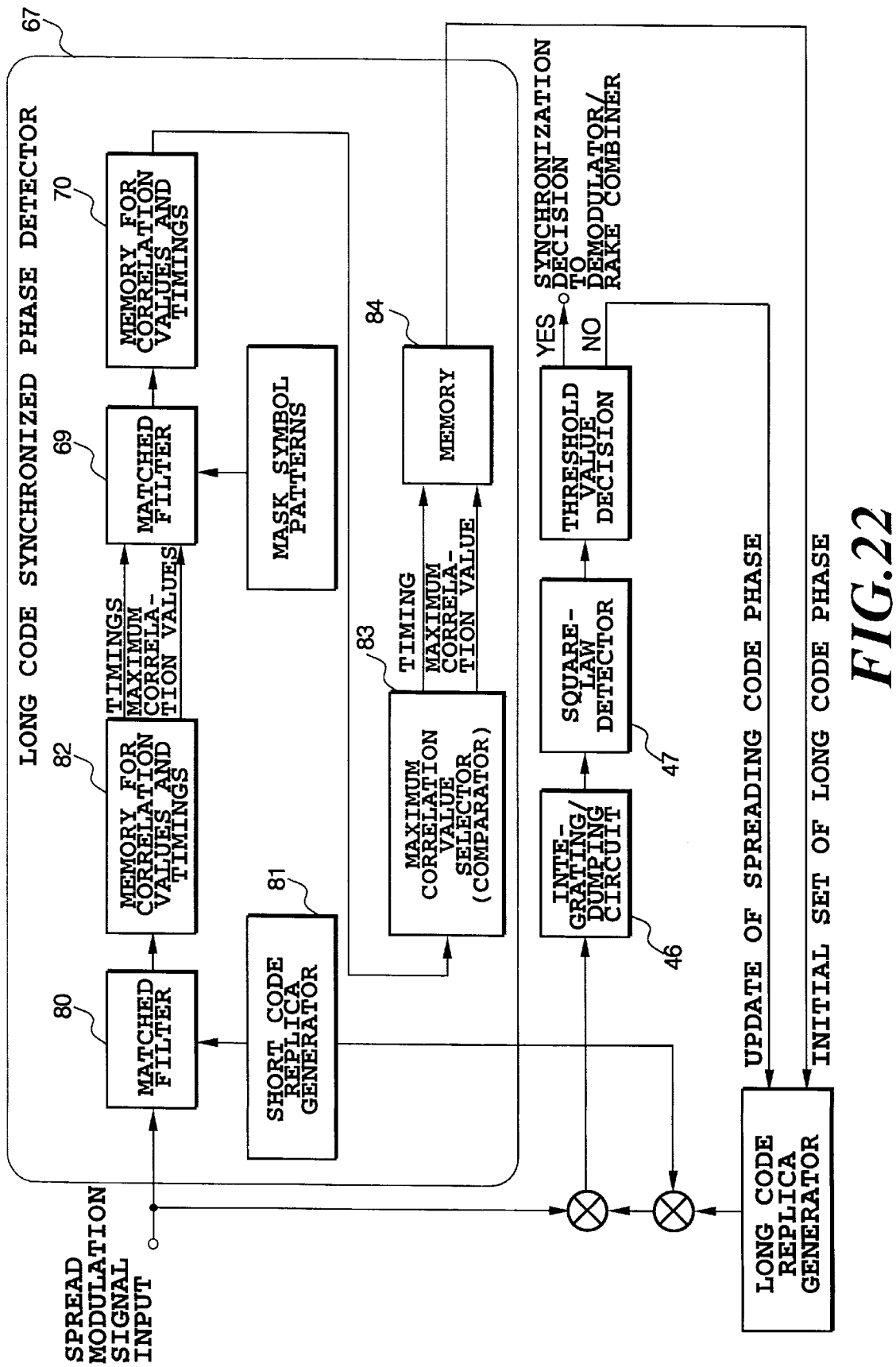
FIG. 22 is a block diagram showing another configuration for the spreading code synchronization processing in the receiver in accordance with the present invention.

FIG. 22 is a block diagram corresponding to claim 16, which operates as follows.

1. A long code synchronized phase detector 67 has a matched filter 69 and a memory 70 inserted after a memory 82 for storing correlation values and timings. The matched filter 69 includes patterns of mask symbols and the memory 70 stores the correlation values and timings passing through the matched filter.

2. Correlations between the spread modulation signal and a short code are detected for one or more long code periods, and the resultant correlation values and their timings are stored in a memory 82.

3. After storing, a correlation value sequence is input to the matched filter 69 which is matched to the insertion interval of the mask symbols to obtain the correlation sums at the respective timings (see, FIG. 15).

4. The resultant correlation sums and timings are stored in the memory 70 for storing them.

5. After completing the detection at all the timings, a maximum correlation value selector 83 selects the maximum correlation sum and its timing which is made the synchronized timing.

6. The operation after this is the same as that of claim 4 or others.

Figure 25B:
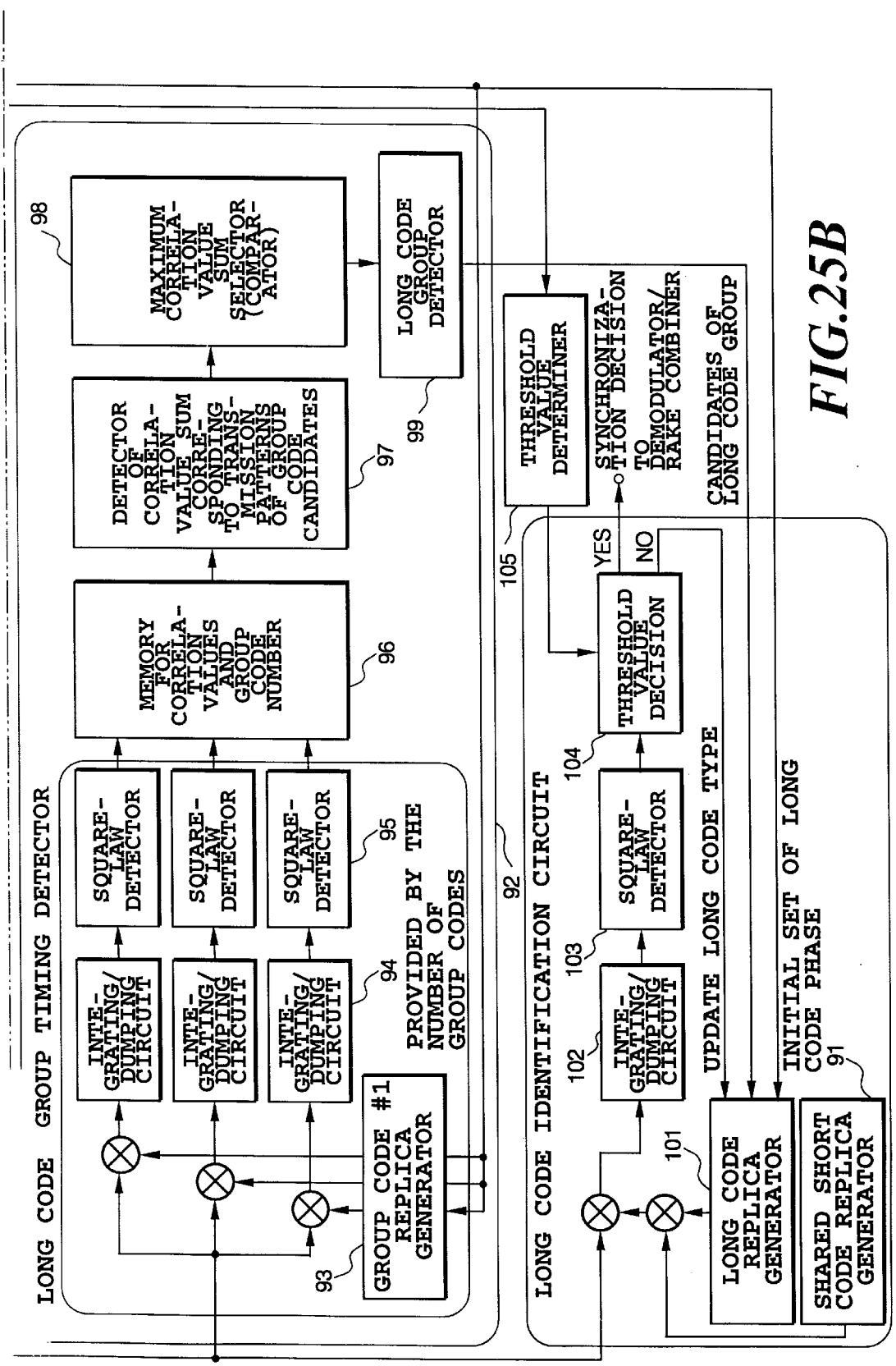
FIG. 25B is a block diagram showing a long code group timing detector and a long code identifying circuit in the synchronization detector associated with the spreading code synchronization method in accordance with claim 20 of the present invention.

FIGS. 25A and 25B show the synchronization detector of the spreading code synchronization method associated with claim 20 of the present invention. Although the operation of a long code timing detector 90 is similar to that of the long code synchronized phase detector 35 of FIG. 17, it employs a shared short code replica generator 91 instead of the short code replica generator 81 because it uses group codes in addition to shared short codes, as the short codes. A memory 84 in the long code timing detector 90 outputs the received timings of a signal spread by a known group code in the received signal, in response to the received timings of the long code which gives the maximum correlation. Group code replica generators 93 are provided by the number of group codes (three in FIGS. 25A and 25B) in a long code group timing detector 92, and generate group code replicas to be multiplied by a received signal at received timings of the corresponding group codes fed from the memory 84. The resultant product signals are integrated over one symbol period by integrating/dumping circuits 94, and square-law detected by square-law detectors 95. The resultant square-law detected values of the correlation integrals associated with the group codes are stored in a memory 96. The foregoing operation is performed on a plurality of signals spread by received group codes, and the results are stored in the memory 96. After completing the correlation detection, a detector 97 obtains, in accordance with the transmission patterns of group code candidates, correlation value sums of the square-law detected values of the correlation integrals whose number equals (the number of the group codes output from the memory 96)×(the number of times of correlation detection). The method for obtaining them was described before in connection with FIG. 24. A selector 98 compares the correlation value sums whose number equals the number of transmission patterns of the group code candidates obtained, and selects the pattern giving the maximum correlation value. Then, a long code group detector 99 detects a long code group including the long code for spreading the received signal from the pattern output from the selector 98. Then, the spreading code synchronization detection proceeds to the long code identification. The operation of a long code identification circuit 100 is the same as the foregoing spreading code synchronization method in accordance with the present invention, in which the long code is detected as follows: First, a multiplier multiplies the received signal by the code obtained by multiplying the long code fed from a long code replica generator 101 by a short code fed from a shared short code replica generator 91; second, an integrating/dumping circuit 102 integrates the resultant product and a square-law detector 103 square-law detects the integral output; and finally a threshold value decision circuit 104 makes a threshold decision. The operation of the threshold value decision circuit 104 is the same as that of the threshold value decision circuit 28 of FIG. 7, and the operation of a threshold value determiner 105 is the same as that of the threshold value determiner 42 of FIG. 17. Incidentally, the long code candidates in the long code replica generator 101 are limited to those belonging to the long code group obtained by the long code group detector described above.

Figure 27B:
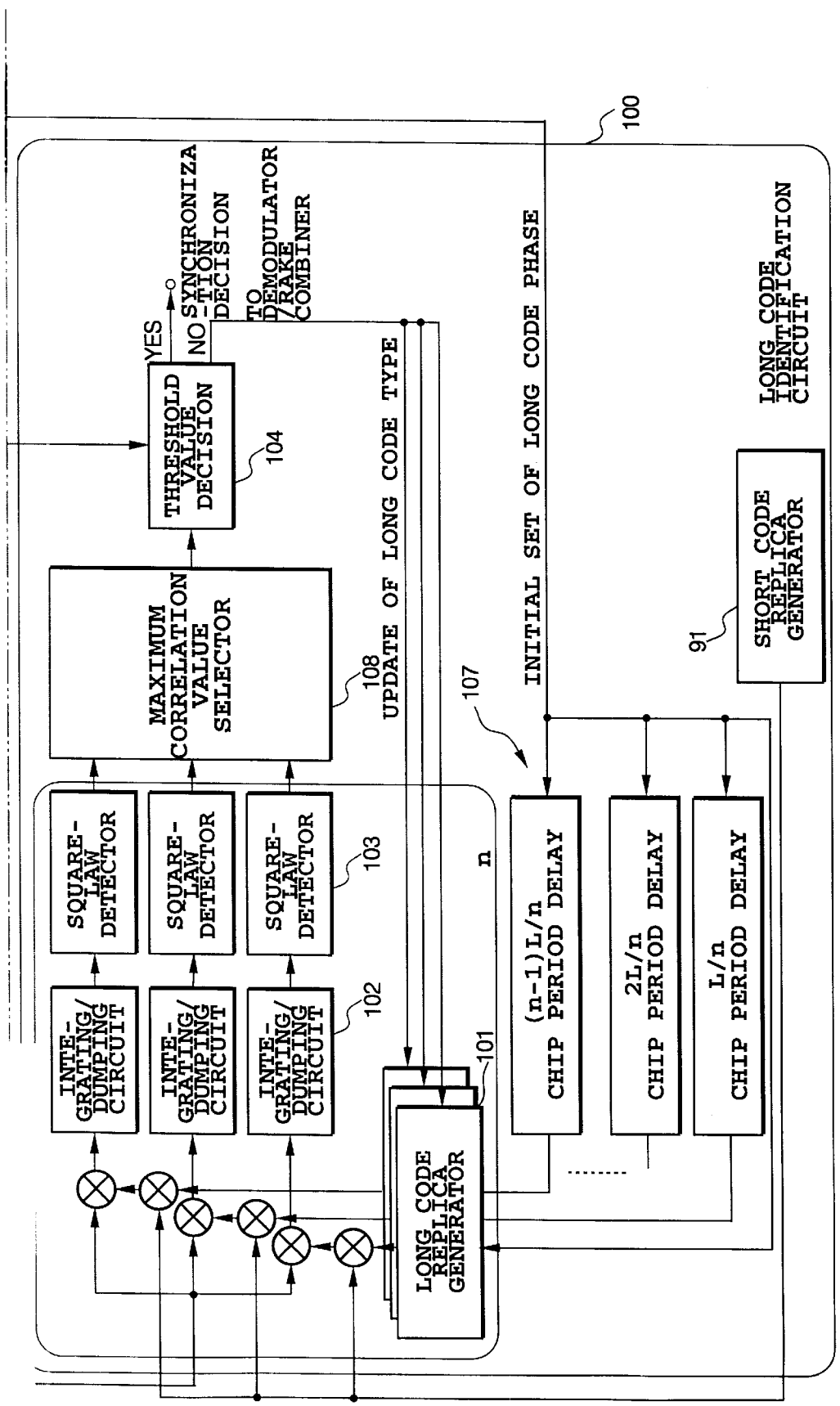
FIG. 27B is a block diagram showing a long code identifying circuit in the synchronization detector associated with the spreading code synchronization method in accordance with claim 21 of the present invention.

FIGS. 27A and 27B show a synchronization detector of the spreading code synchronization method according to claim 21 of the present invention. It differs from the spreading code synchronization method of FIG. 7 in the following. First, a long code timing detector 106 observes correlation peaks at every L/n chip periods so that the received timing is detected of symbols spread by a shared short code at every interval of L/n chip periods. This enables the capacity of the memory 82 to be reduced.

Second, a long code identification circuit 100, in which n long code replica generators 101 are supplied with initial set values of the long code phase through (n−1) delay circuits 107, detects in parallel the correlations between the received signal and the codes obtained by multiplying the long code replicas whose phases are shifted by an amount of L/n from one another by the short code fed from a shared short code replica generator 91. Then, a maximum correlation value selector 108 selects the maximum correlation value, and a threshold value decision circuit 104 makes a threshold value decision of the maximum correlation value.

As described above, according to the present invention, in the long code system in which the base stations are asynchronous, the mobile station can achieve high speed, high accuracy spreading code synchronization of a forward control channel. Furthermore, since the matched filter is used only for the initial short code search, and a sliding correlator is used for the long code search thereafter, the consumed power by the entire spreading code synchronization detector does not increase so much.

What is claimed is:

1. A signal transmission method in a mobile communication system in a direct sequence CDMA communication system which transmits a wideband signal spread using a spreading code with a rate higher than an information rate, said signal transmission method comprising the steps of:

using a first spreading code group and a second spreading code group, said first spreading code group being common to respective base stations and having a period equal to an information symbol period, and said second spreading code group being different from base station to base station and having a period longer than the information symbol period; and masking, when transmitting a signal which is doubly spread using a first spreading code in said first spreading code group and a second spreading code in said second spreading code group, said second spreading code for M symbols at fixed intervals, where M is a natural number equal to or greater than one.

2. A transmitter in a mobile communication system comprising:

first code spreading means for spreading signals of all channels using first spreading codes which belong to a first spreading code group and differ from one another, said first spreading code group being common to respective base stations and having a period equal to an information symbol period;

second code spreading means for spreading for M symbols one or more spread signals fed from said first code spreading means using a third spreading code, where M is a natural number equal to or greater than one, said third spreading code being a complex conjugate of a second spreading code which differs from base station to base station and has a period longer than the information symbol period;

adding means for adding at appropriate timings a signal on a channel spread by said first code spreading means and signals of one or more channels spread by said second code spreading means; and third code spreading means for spreading by using said second spreading code the signals of the channels output from said adding means.

3. A receiver in a mobile communication system comprising:

first synchronization detecting means for detecting a synchronized time of a first spreading code from a detection time of a correlation output value, said correlation output value being obtained through a correlation detection processing between a spreading modulation signal obtained by receiving a signal transmitted by a transmitter and a first spreading code in a first spreading code group; and second synchronization detection means for performing correlation detection sequentially using codes obtained by multiplying said first spreading code by A (A is a neutral number) second spreading codes in a second spreading code group, and for deciding a second spreading code having a maximum correlation value, wherein said correlation detection is started from a time position at which a maximum correlation value is detected by said first synchronization detection means.

4. A receiver of a mobile communication system comprising:

first spreading code synchronized phase memory means for storing B dominant time positions in descending order of magnitude of correlation values detected by first synchronization means;

second spreading code synchronization detecting means for performing correlation operations sequentially between a received signal and codes obtained by multiplying a first spreading code by B spreading codes in the second spreading codes of contiguous base stations of a current base station of which the current base station notifies, wherein said correlation operations are started from time positions stored in said first spreading code synchronization memory means, and are carried out in descending order of magnitude of the correlation values stored in said first spreading code synchronization memory means; and means for detecting which codes of the second spreading codes correspond to the B dominant time positions of the first spreading codes.

5. A spreading code synchronization method comprising the steps of:

performing correlation detection between a received spread modulation signal and codes obtained by multiplying a first spreading code by second spreading codes of the second spreading code group, wherein said correlation detection is started from a time position at which a maximum correlation output signal is obtained in correlation detection between the first spreading code and the received spread modulation signal obtained by receiving a signal transmitted by a transmitter; and deciding, after carrying out the correlation detection between the received spread modulation signal and the codes obtained by multiplying the first spreading code by the second spreading codes, the second spreading code by giving a maximum correlation value as the second spreading code used for spreading the received spread modulation signal.

6. The spreading code synchronization method as claimed in claim 5, wherein a searching is continued until the maximum correlation value between the received spread modulation signal and the codes obtained by multiplying the first spreading code by the second spreading codes exceeds a predetermined threshold value T.

7. The spreading code synchronization method as claimed in claim 6, wherein the threshold value T is determined depending on the maximum correlation detection value between the received spread modulation signal and the first spreading code.

8. A receiver comprising:

first spreading code synchronized phase memory means; and received level detection means for detecting received signal power by generating delay profiles of multipaths for each base stations by detecting correlations between a received spread modulation signal and codes obtained by multiplying a first spreading code by second spreading codes of a current base station and continuous base stations in a particular time range around a time position of said first spreading code synchronized phase memory means, wherein said received level detecting means carries out, in a second and following searches, a search around a time position of a path obtained by a previous search.

9. The receiver as claimed in claim 8, wherein said received level detecting means suppresses a searching at symbol positions spread by only the first spreading code when a frame structure is used which includes portions spread by only the first spreading code for one or more symbols.

10. A spreading code synchronization method comprising:

a first synchronization detection step of performing correlation detection processing between a spread modulation signal obtained by receiving a signal transmitted by a transmitter and a first spreading code of a first spreading code group to detect a synchronized time of the first spreading code from a detection time of the correlation output value; and a second synchronization detection step of performing correlation detection sequentially on codes obtained by multiplying the first spreading code by A (A is a natural number) second spreading codes in the second spreading code group of claim 1 to decide a second spreading code having a maximum correlation value, wherein said correlation detection is started at a time position at which said maximum correlation value is detected by said first synchronization detection step.

11. A spreading code synchronization method comprising:

a first spreading code synchronized phase memorizing step of storing B dominant time positions in descending order of magnitude of correlation values;

a second spreading code synchronization detection step of performing, in descending order of magnitude of correlation values, correlation operations sequentially between a received signal and codes obtained by multiplying a first spreading code by B spreading codes of a second spreading code of contiguous base stations of a current base station of which the current base station notifies, wherein the correlation operations are started from time positions stored in said first spreading code synchronized phase memorizing step; and a step of detecting which second spreading codes correspond to B dominant time portions of the correlation values with the first spreading code.

12. The spreading code synchronization method as claimed in any one of claims 5–7, 10 and 11, wherein the correlation detection between said first spreading code and said received spread modulation signal, and the correlation detection between said received spread modulation signal and said codes obtained by multiplying said second spreading codes by the first spreading code are performed in parallel.

13. The spreading code synchronization method as claimed in any one of claims 5–7, 10 and 11, wherein when detecting the second spreading code synchronized phase of contiguous base stations using correlation values between the first spreading code and the received spread modulation signal in a contiguous base station search mode of deciding a base station to be connected at handover during communications, phases different from a synchronized phase of a current base station are selected as candidates of synchronized phases of the contiguous base stations to be decided.

14. The signal transmission method in a mobile communication system as claimed in claim 1, wherein two or more mask symbols for masking said second spreading codes are intermittently provided during one second spreading code period.

15. The signal transmission method in the mobile communication system as claimed in claim 14, wherein transmission timings of said mask symbols are set at uneven intervals known in advance to a mobile station side.

16. The spreading code synchronization method as claimed in any one of claims 5–7, 10 and 11, wherein a phase of the received second spreading code is uniquely decided in accordance with received timings of said unevenly disposed mask symbols when receiving the signal transmitted by the transmission method of claim 15.

17. The spreading code synchronization method as claimed in claims 5–7, 10 and 11, wherein when there is deviation between clocks of a transmitter and a receiver, correlations are obtained in parallel using a plurality of correlators whose phases are shifted from one another by an amount of Δ which corresponds to aTc, where a is a real number and Tc is a chip period, while performing correlation detection between the received spread modulation signal and the codes obtained by multiplying the first spreading code by the second spreading code in the second spreading code group.

18. The signal transmission method in a mobile communication system as claimed in claim 14, wherein said second spreading code is masked n times during its period L, at even intervals L/n.

19. The signal transmission method in a mobile communication system as claimed in any one of claims 1, 14, 15 and 18 further comprising the step of transmitting at a predetermined timing a signal spread by an unshared first spreading code corresponding to the second spreading code used by each of the base stations.

20. A spreading code synchronization method comprising the steps of:

receiving a signal;

detecting a receiving timing of a second spreading code by detecting correlation between the received signal and a shared first spreading code;

detecting a second spreading code group including a second spreading code to be used for spreading the received signal by detecting correlation between the received signal and first spreading codes in a first spreading code group at received timings of signals spread by unshared first spreading codes, which received timings are obtained from received timings of the second spreading codes, and by deciding the unshared first spreading code giving a maximum correlation; and identifying the second spreading code used for spreading the received signal from magnitudes of correlation values detected between the received signal and spreading code by the second spreading codes in the second spreading code group detected in the preceding step.

21. The spreading code synchronization method as claimed in any one of claims 5–7, 10, 11 and 20, comprising the steps of:

receiving a signal transmitted by the transmission method of claim 18;

detecting received timings of signals spread by only the first spreading code from timings giving maximum correlation values obtained by observing correlation between the received signal and the first spreading code at every interval of the L/n periods;

detecting n received timings of said second spreading code which are shifted by an amount of the L/n periods from one another using said received timings of the signals spread by only the first spreading code; and detecting correlation values between the received signal and the spreading codes obtained by multiplying the first spreading code by the second spreading codes in the second spreading code group at phases synchronized with the detected n received timings of the second spreading code shifted by the amount of L/n periods to identify the second spreading code to be used for spreading the received signal from magnitudes of the correlation values and to determine n received timing candidates of said second spreading code.

22. The spreading code synchronization method as claimed in any one of claims 5–7, 10 11, and 20, wherein correlations are taken between the received spread modulation signal and the codes obtained by multiplying the first spreading code by the second spreading codes in parallel at a plurality of peak positions of a correlation between the received spread modulation signal and the first spreading code, thereby improving a detection accuracy of the spreading code synchronization, wherein said peak positions are due to multipaths.

23. The spreading code synchronization method as claimed in claim 20, wherein the correlation detection between said first spreading code and said received spread modulation signal, and the correlation detection between said received spread modulation signal and said codes obtained by multiplying said second spreading codes by the first spreading code are performed in parallel.

24. The spreading code synchronization method as claimed in claim 20, wherein when detecting the second spreading code synchronized phase of contiguous base stations using correlation values between the first spreading code and the received spread modulation signal in a contiguous base station search mode of deciding a base station to be connected at handover during communications, phases except for a synchronized phase of a current base station are selected as synchronized phase candidates of the contiguous base stations to be decided.

25. The spreading code synchronization method as claimed in claim 20, wherein a phase of the received second spreading code is uniquely decided in accordance with a received timing of said unevenly disposed mask symbols when receiving the signal.

26. The spreading code synchronization method as claimed in claim 20, wherein when there is deviation between clocks of a transmitter and a receiver, correlations are obtained in parallel using a plurality of correlators whose phases are shifted from one another by an amount of $\Delta$ which corresponds to aTc, where a is a real number and Tc is a chip period, while performing correlation detection between the received spread modulation signal and the codes obtained by multiplying the first spreading code by the second spreading code in the second spreading code group.

27. The spreading code synchronization method as claimed in claim 10, wherein the correlation detection between said first spreading code and said received spread modulation signal, and the correlation detection between said received spread modulation signal and said codes obtained by multiplying said second spreading codes by the first spreading code are performed in parallel.

28. The spreading code synchronization method as claimed in claim 11, wherein the correlation detection between said first spreading code and said received spread modulation signal, and the correlation detection between said received spread modulation signal and said codes obtained by multiplying said second spreading codes by the first spreading code are performed in parallel.

29. The spreading code synchronization method as claimed in claim 10, wherein when detecting the second spreading code synchronized phase of contiguous base stations using correlation values between the first spreading code and the received spread modulation signal in a contiguous base station search mode of deciding a base station to be connected at handover during communications, phases different from a synchronized phase of a current base station are selected as candidates of synchronized phases of the contiguous base stations to be decided.

30. The spreading code synchronization method as claimed in claim 11, wherein when detecting the second spreading code synchronized phase of contiguous base stations using correlation values between the first spreading code and the received spread modulation signal in a contiguous base station search mode of deciding a base station to be connected at handover during communications, phases different from a synchronized phase of a current base station are selected as candidates of synchronized phases of the contiguous base stations to be decided.

* * * * *

UNITED STATES PATENT AND TRADEMARK OFFICE
CERTIFICATE OF CORRECTION

PATENT NO : 6,167,037
DATED : December 26, 2000
INVENTOR(S) : Kenichi Higuchi, et al.

It is certified that error appears in the above-identified patent and that said Letters Patent are hereby corrected as shown below:

, item [73] Assignee, line 2, delete "Networks" and insert in its place --Network--.

At column 28, line 3, delete "received".

At column 28, line 5, delete "received".

At column 28, line 11, delete second occurrence of "said" and insert in its place --a--.

At column 28, line 20, delete "received".

At column 28, line 31, delete "the" and insert in its place --a--.

Signed and Sealed this

Fifteenth Day of May, 2001

*Attest:*

NICHOLAS P. GODICI

*Attesting Officer*     Acting Director of the United States Patent and Trademark Office